United States Patent
Liu et al.

(10) Patent No.: US 12,199,890 B2
(45) Date of Patent: Jan. 14, 2025

(54) METHOD AND DEVICE IN NODES USED FOR WIRELESS COMMUNICATION

(71) Applicants: Zheng Liu, Shanghahi (CN); Xiaobo Zhang, Shanghai (CN)

(72) Inventors: Zheng Liu, Shanghahi (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 365 days.

(21) Appl. No.: 17/715,020

(22) Filed: Apr. 6, 2022

(65) Prior Publication Data

US 2022/0231802 A1    Jul. 21, 2022

Related U.S. Application Data

(63) Continuation of application No. PCT/CN2020/121054, filed on Oct. 15, 2020.

(30) Foreign Application Priority Data

Oct. 29, 2019  (CN) .......................... 201911039426.7

(51) Int. Cl.
   *H04L 27/26*      (2006.01)
   *H04L 5/00*       (2006.01)
   (Continued)

(52) U.S. Cl.
   CPC ........ *H04L 5/001* (2013.01); *H04L 27/26025* (2021.01); *H04W 56/0045* (2013.01); *H04W 72/12* (2013.01)

(58) Field of Classification Search
   CPC ........ H04L 27/26025; H04W 56/0045; H04W 72/12
   (Continued)

(56) References Cited

U.S. PATENT DOCUMENTS

2018/0098323 A1 * 4/2018 Zhang ...................... H04L 5/00

FOREIGN PATENT DOCUMENTS

| CN | 106612561 A | 5/2017 |
| CN | 107634821 A | 1/2018 |

(Continued)

OTHER PUBLICATIONS

ISR received in application No. PCT/CN2020/121054 dated Jan. 7, 2021.

(Continued)

*Primary Examiner* — Intekhaab A Siddiquee

(57) ABSTRACT

The present disclosure provides a method and device in a node for wireless communications. A node receives first information, the first information is used to determine a target time-frequency resource set, an earliest multicarrier symbol comprised in the target time-frequency resource set in time domain is a first multicarrier symbol, frequency-domain resources comprised in the target time-frequency resource set belong to a first frequency-domain resource pool; transmits a first signal, frequency-domain resources occupied by the first signal belong to a second frequency-domain resource pool, a frequency-domain relation between the first frequency-domain resource pool and the second frequency-domain resource pool is used to determine a reference delay; receives a second signal, a length of a time interval between a start time of a second multicarrier symbol and an end time for receiving the second signal is equal to the reference delay. The application ensures the correct reception of the feedback.

20 Claims, 6 Drawing Sheets

(51) Int. Cl.
*H04W 56/00* (2009.01)
*H04W 72/12* (2023.01)

(58) Field of Classification Search
USPC .......................................................... 370/329
See application file for complete search history.

(56) References Cited

FOREIGN PATENT DOCUMENTS

| | | | | |
|---|---|---|---|---|
| CN | 108111199 | A | 6/2018 | |
| CN | 108988983 | A | 12/2018 | |
| CN | 109245869 | A | 1/2019 | |
| CN | 110140400 | A | 8/2019 | |
| CN | 110268780 | A | 9/2019 | |
| WO | WO-2019197025 | A1 * | 10/2019 | ........... H04B 7/0456 |

OTHER PUBLICATIONS

CN201911039426.7 First Office Action dated Sep. 18, 2021.
CN201911039426.7 First Search Report dated Sep. 13, 2021.
CN201911039426.7 Notification to Grant Patent Right for Invention dated Jan. 11,2022.
Nokia. Nokia Shanghai Bell. "Discussions on NR V2X Sidelink Physical Layer Structures" 3GPP TSG RAN WGI Meeting #95 R1-1813519, Nov. 16, 2018.
MediaTek Inc "Physical layer structure for NR sidelink" 3gpp tsg ran wg1_ran1 R1-1810453,Sep. 28, 2018.
MediaTek Inc "Discussion on physical layer structure for NR sidelink" 3gpp tsg ran wg1_ran1 R1-1812364,Nov. 2, 2018.
MediaTek Inc "Discussion on sidelink physical layer structure" 3gpp tsg ran wg1_ran1 R1-1906553,May 4, 2019.
First Office Action of Chinese patent application No. CN202210224343.0 dated Jan. 6, 2024.
First Search Report of Chinese patent application No. CN202210224343.0 dated Jan. 5, 2024.
ZTE, Sanechips "Summary of [105bis#31][NR/V2X] Resource pool configuration and selection (ZTE)" 3GPP TSG-RAN WG2 #106 R2-1906495 May 6, 2019.

* cited by examiner

| Switching time (unit for measurement: Tc=1/(480000*4096) s) | Frequency range 1 | Frequency range 2 |
|---|---|---|
| Switching time from transmission to reception | 25600 | 13792 |
| Switching time from reception to transmission | 25600 | 13792 |

FIG. 9

| Subcarrier spacing #1 | Subcarrier spacing #2 | Time length of slot (ms) | Second delay (unit for measurement: slot) |
|---|---|---|---|
| 15kHz | 15kHz | 1 | 1 |
| 30kHz | 15kHz | 0.5 | 1 |
| 30kHz | 30kHz | 0.5 | 1 |
| 60kHz | 15kHz | 0.25 | 3 |
| 60kHz | 30kHz | 0.25 | 3 |
| 60kHz | 60kHz | 0.25 | 3 |
| 120kHz | 60kHz | 0.125 | 5 |
| 120kHz | 120kHz | 0.125 | 5 |

FIG. 10

| First subcarrier spacing | First characteristic delay (unit for measurement: multicarrier symbol) | Second subcarrier spacing | second characteristic delay (unit for measurement: multicarrier symbol) |
|---|---|---|---|
| 15kHz | 10 | 15kHz | 10 |
| 30kHz | 12 | 30kHz | 12 |
| 60kHz | 23 | 60kHz | 23 |
| 120kHz | 36 | 120kHz | 36 |

FIG. 11

| Information format index | Number of occupied multicarrier symbols | Number of carried bits | Channel coding scheme |
|---|---|---|---|
| 0 | 1 – 2 | ≤2 | sequence |
| 1 | 4 – 14 | ≤2 | sequence |
| 2 | 1 – 2 | >2 | Block Code |
| 3 | 1 – 2 | >2 | Polar Code |
| 4 | 4 – 14 | >2 | Block Code |
| 5 | 4 – 14 | >2 | Polar Code |
FIG. 12
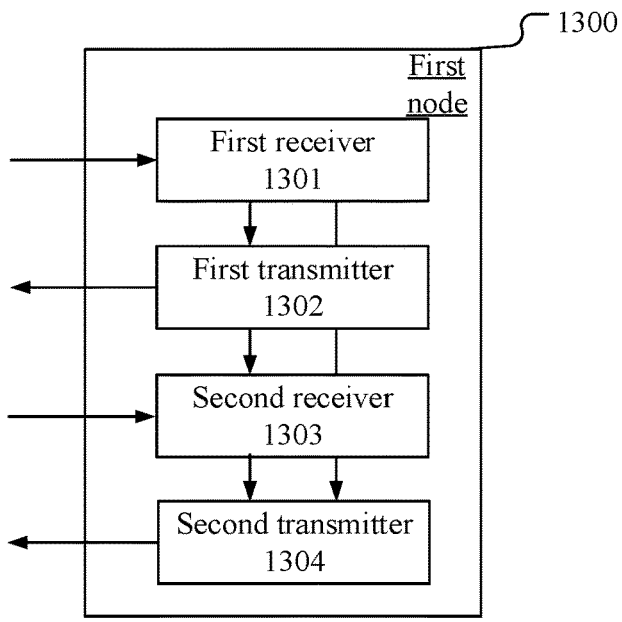
FIG. 13
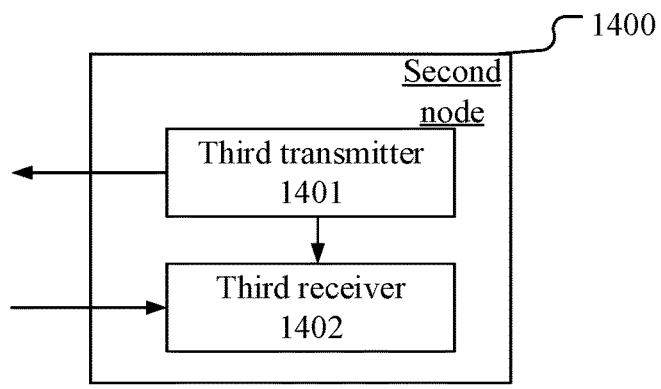
FIG. 14

METHOD AND DEVICE IN NODES USED FOR WIRELESS COMMUNICATION

CROSS REFERENCE TO RELATED APPLICATIONS

This application is the continuation of International Patent Application No. PCT/CN2020/121054, filed on Oct. 15, 2020, which claims the priority benefit of Chinese Patent Application No. 201911039426.7, filed on Oct. 29, 2019, the full disclosure of which is incorporated herein by reference.

BACKGROUND

Technical Field

The present disclosure relates to transmission methods and devices in wireless communication systems, and in particular to a transmission scheme and device of feedback information in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. The technical Study Item (SI) of NR V2X was approved at 3GPP RAN #80 Plenary. The WI was decided to be started for standardizing NR V2X at 3GPP RAN #83 Plenary.

SUMMARY

Compared with the existing LTE V2X system, NR V2X has a notable feature in supporting Groupcast and Unicast as well as Hybrid Automatic Repeat Request (HARQ) functions. At 3GPP RANI #95 meeting, an independent Physical Sidelink Feedback Channel (PSFCH) is agreed to be introduced. The PSFCH is used to carry a HARQ. In addition, 3GPP agrees that a User Equipment (UE) can report a HARQ feedback of sidelink to a base station. The design of UE reporting to the base station the HARQ feedback of the sidelink needs a solution.

In view of the problem in the design of a HARQ feedback report of the sidelink, the present disclosure provides a solution. It should be noted that though the present disclosure only took the NR V2X scenario for example in the statement above; this application is also applicable to other scenarios (such as relay networks, D2D networks, cellular networks, scenarios supporting half-duplex UE) confronting similar problems other than the NR V2X, where similar technical effects can be achieved. Additionally, the adoption of a unified solution for various scenarios, including but not limited to the NR V2X scenario and sidelink transmission, contributes to the reduction of hardcore complexity and costs. If no conflict is incurred, embodiments in a first node in the present disclosure and the characteristics of the embodiments are also applicable to a second node, and vice versa. Particularly, for interpretations of the terminology, nouns, functions and variants (if not specified) in the present disclosure, refer to definitions given in TS36 series, TS38 series and TS37 series of 3GPP specifications.

The present disclosure provides a method in a first node for wireless communications, comprising:

receiving first information, the first information being used to determine a target time-frequency resource set, an earliest multicarrier symbol comprised in the target time-frequency resource set in time domain being a first multicarrier symbol, frequency-domain resources comprised in the target time-frequency resource set belonging to a first frequency-domain resource pool;

transmitting a first signal, frequency-domain resources occupied by the first signal belonging to a second frequency-domain resource pool, a frequency-domain relation between the first frequency-domain resource pool and the second frequency-domain resource pool being used to determine a reference delay;

receiving a second signal, a length of a time interval between a start time of a second multicarrier symbol and an end time for receiving the second signal being equal to the reference delay, the start time of the second multicarrier symbol being not earlier than the end time for receiving the second signal; and when the first multicarrier symbol is not earlier than the second multicarrier symbol, transmitting second information;

herein, when the second information is transmitted, the target time-frequency resource set is used for a transmission of the second information; time-frequency resources occupied by the first signal are used to determine radio resources occupied by the second signal; information carried by the second signal is used to determine the second information, and a transmitter of the first information is different from a transmitter of the second signal.

In one embodiment, a transmission of the second information is determined according to a chronological relation of the first multicarrier symbol and the second multicarrier symbol, which enables that a timing of a sidelink HARQ-ACK transmitting a report to a base station satisfies a minimum delay requirement of a UE and takes into account a processing capability of the UE, thus reducing the burden and the complexity of the UE in implementation.

In one embodiment, a frequency-domain relation between the first frequency-domain resource pool and the second frequency-domain resource pool is used to determine the reference delay, a relation between an uplink Bandwidth Part (BWP) and a sidelink BWP is taken into account when calculating a timing relation of a sidelink HARQ-ACK transmitting a report to a base station, which enables that a timing of the sidelink HARQ-ACK transmitting the report to the base station satisfies the processing capability of the UE while ensuring independent configuration of the uplink BWP and the sidelink BWP at the same time, so as to avoid a failure in the sidelink HARQ-ACK transmitting the report to the base station and avoid the implementation complexity of the UE.

According to one aspect of the present disclosure, the above method is characterized in that when the first multicarrier symbol is earlier than the second multicarrier symbol, the first node may drop transmitting the second information, or the first node may ignore the first information, or the first node device may assume the target time-frequency resource set invalid.

According to one aspect of the present disclosure, the above method is characterized in that the reference delay is not less than a first delay, and a length of a switching time between a reception and a transmission of the first node is used to determine the first delay.

In one embodiment, a time required by a reception-transmission switching of the UE that cannot be full duplex is taken into account when calculating the reference delay to further avoid the failure in the sidelink HARQ-ACK transmitting a report to the base station and reduce the implementation complexity of the UE at the same time.

According to one aspect of the present disclosure, the above method is characterized in that the reference delay is not less than a second delay; when the first frequency-domain resource pool is the same as the second frequency-domain resource pool, the second delay is equal to 0; when the first frequency-domain resource pool is different from the second frequency-domain resource pool, the second delay is greater than 0, and one of a subcarrier spacing (SCS) of a subcarrier comprised in the first time-frequency resource pool in frequency domain or an SCS of a subcarrier comprised in the second time-frequency resource pool in frequency domain is used to determine the second delay.

According to one aspect of the present disclosure, the above method is characterized in that the reference delay is not less than a third delay, an SCS of a subcarrier comprised in the first time-frequency resource pool in frequency domain is equal to a first SCS, and an SCS of a subcarrier comprised in the second time-frequency resource pool in frequency domain is equal to a second SCS, the first SCS is used to determine a first characteristic delay, the second SCS is used to determine a second characteristic delay, and one of the first characteristic delay or the second characteristic delay is used to determine the third delay.

According to one aspect of the present disclosure, the above method is characterized in that the second signal carries physical layer information, the physical layer information carried by the second signal is used to determine whether the first signal is correctly received, and an information format adopted by the physical layer information carried by the second signal is used to determine the third delay.

In one embodiment, the third delay is determined according to an information format adopted by physical layer information carried by the second signal, so that the reference delay is determined, taking into account the differences in processing complexity of UEs with different Sidelink Feedback Information (SFI) formats, especially the processing complexity of UEs between sequence decorrelation and channel decoding, and in the case that the system can support a variety of different SFI formats, a timing of a sidelink HARQ-ACK transmitting a report to a base station can still satisfy the processing capacity requirement of the UE.

According to one aspect of the present disclosure, the above method is characterized in comprising:
  receiving a first signaling;
  herein, the first signaling is used to determine time-frequency resources occupied by the first signal, the first signaling is used to determine a length of a time interval between a start time of the first multicarrier symbol and an end time for receiving the first signaling.

According to one aspect of the present disclosure, the above method is characterized in comprising:
  receiving third information and fourth information;
  herein, the third information is used to determine the first frequency-domain resource pool and an SCS of a subcarrier comprised in the first frequency-domain resource pool, and the fourth information is used to determine the second frequency-domain resource pool and an SCS of a subcarrier comprised in the second frequency-domain resource pool.

The present disclosure provides a method in a second node for wireless communications, comprising:
  transmitting first information and a first signaling, the first information being used to indicate a target time-frequency resource set, an earliest multicarrier symbol comprised in the target time-frequency resource set in time domain being a first multicarrier symbol, frequency-domain resources comprised in the target time-frequency resource set belonging to a first frequency-domain resource pool; and
  receiving second information;
  herein, the first signaling is used to indicate time-frequency resources occupied by a first signal, frequency-domain resources occupied by the first signal belong to a second frequency-domain resource pool, a frequency-domain relation between the first frequency-domain resource pool and the second frequency-domain resource pool is used to determine a reference delay; time-frequency resources occupied by the first signal are used to indicate radio resources occupied by a second signal; a length of a time interval between a start time of a second multicarrier symbol and an end time for receiving the second signal is equal to the reference delay, the start time of the second multicarrier symbol is not earlier than the end time for receiving the second signal; the target time-frequency resource set is used for a transmission of the second information; information carried by the second signal is used to determine the second information, and a transmitter of the second signal is a node other than the second node; the first multicarrier symbol is not earlier than the second multicarrier symbol.

According to one aspect of the present disclosure, the above method is characterized in that the reference delay is not less than a first delay, and a length of a switching time between a reception and a transmission of a transmitter of the second information is used to determine the first delay.

According to one aspect of the present disclosure, the above method is characterized in that the reference delay is not less than a second delay; when the first frequency-domain resource pool is the same as the second frequency-domain resource pool, the second delay is equal to 0; when the first frequency-domain resource pool is different from the second frequency-domain resource pool, the second delay is greater than 0, and one of an SCS of a subcarrier comprised in the first time-frequency resource pool in frequency domain or an SCS of a subcarrier comprised in the second time-frequency resource pool in frequency domain is used to determine the second delay.

According to one aspect of the present disclosure, the above method is characterized in that the reference delay is not less than a third delay, an SCS of a subcarrier comprised in the first time-frequency resource pool in frequency domain is equal to a first SCS, and an SCS of a subcarrier comprised in the second time-frequency resource pool in frequency domain is equal to a second SCS, the first SCS is used to determine a first characteristic delay, the second SCS is used to determine a second characteristic delay, and one of the first characteristic delay or the second characteristic delay is used to determine the third delay.

According to one aspect of the present disclosure, the above method is characterized in that the second signal carries physical layer information, the physical layer information carried by the second signal is used to determine whether the first signal is correctly received, and an information format adopted by the physical layer information carried by the second signal is used to determine the third delay.

According to one aspect of the present disclosure, the above method is characterized in that the first signaling is used to indicate a length of a time interval between a start time of the first multicarrier symbol and an end time for receiving the first signaling.

According to one aspect of the present disclosure, the above method is characterized in also comprising:

transmitting third information and fourth information;

herein, the third information is used to indicate the first frequency-domain resource pool and an SCS of a subcarrier comprised in the first frequency-domain resource pool, and the fourth information is used to indicate the second frequency-domain resource pool and an SCS of a subcarrier comprised in the second frequency-domain resource pool.

The present disclosure provides a first node for wireless communication, comprising:

a first receiver, receiving first information, the first information being used to determine a target time-frequency resource set, an earliest multicarrier symbol comprised in the target time-frequency resource set in time domain being a first multicarrier symbol, frequency-domain resources comprised in the target time-frequency resource set belonging to a first frequency-domain resource pool;

a first transmitter, transmitting a first signal, frequency-domain resources occupied by the first signal belonging to a second frequency-domain resource pool, a frequency-domain relation between the first frequency-domain resource pool and the second frequency-domain resource pool being used to determine a reference delay;

a second receiver, receiving a second signal, a length of a time interval between a start time of a second multicarrier symbol and an end time for receiving the second signal being equal to the reference delay, the start time of the second multicarrier symbol being not earlier than the end time for receiving the second signal; and a second transmitter, when the first multicarrier symbol is not earlier than the second multicarrier symbol, transmitting second information;

herein, when the second information is transmitted, the target time-frequency resource set is used for a transmission of the second information; time-frequency resources occupied by the first signal are used to determine radio resources occupied by the second signal; information carried by the second signal is used to determine the second information, and a transmitter of the first information is different from a transmitter of the second signal.

The present disclosure provides a second node for wireless communications, comprising:

a third transmitter, transmitting first information and a first signaling, the first information being used to indicate a target time-frequency resource set, an earliest multicarrier symbol comprised in the target time-frequency resource set in time domain being a first multicarrier symbol, frequency-domain resources comprised in the target time-frequency resource set belonging to a first frequency-domain resource pool; and a third receiver, receiving second information;

herein, the first signaling is used to indicate time-frequency resources occupied by a first signal, frequency-domain resources occupied by the first signal belong to a second frequency-domain resource pool, a frequency-domain relation between the first frequency-domain resource pool and the second frequency-domain resource pool is used to determine a reference delay; time-frequency resources occupied by the first signal are used to indicate radio resources occupied by a second signal; a length of a time interval between a start time of a second multicarrier symbol and an end time for receiving the second signal is equal to the reference delay, the start time of the second multicarrier symbol is not earlier than the end time for receiving the second signal; the target time-frequency resource set is used for a transmission of the second information; information carried by the second signal is used to determine the second information, and a transmitter of the second signal is a node other than the second node; the first multicarrier symbol is not earlier than the second multicarrier symbol.

In one embodiment, the method in the present disclosure is advantageous in the following aspects:

the method in the present disclosure enables that a timing of a sidelink HARQ-ACK transmitting a report to a base station satisfies a minimum delay requirement of a UE and takes into account the processing capability of the UE, so as to reduce the burden and complexity of the UE in implementation.

the method in the present disclosure takes into account a relation between an uplink BWP and a sidelink BWP when calculating a timing relation of a sidelink HARQ-ACK transmitting a report to a base station, which enables that the timing of the sidelink HARQ-ACK transmitting the report to the base station satisfies the processing capability of the UE while ensuring independent configuration of the uplink BWP and the sidelink BWP at the same time, so as to avoid a failure in the sidelink HARQ-ACK transmitting the report to the base station, thus reducing the implementation complexity of the UE.

the method in the present disclosure takes into account a time required by a reception-transmission switching of the UE that cannot be full duplex to further avoid a failure in the sidelink HARQ-ACK transmitting the report to the base station and reduce the implementation complexity of the UE at the same time.

the method in the present disclosure takes into account the differences in processing complexity of UEs with different SFI formats, especially the processing complexity of UEs between sequence decorrelation and channel decoding, and in the case that the system can support a variety of different SFI formats, the timing of the sidelink HARQ-ACK transmitting the report to the base station can still satisfy the processing capacity requirement of the UE.

BRIEF DESCRIPTION OF THE DRAWINGS

Other features, objects and advantages of the present disclosure will become more apparent from the detailed description of non-restrictive embodiments taken in conjunction with the following drawings:

FIG. 9 illustrates a schematic diagram of a length of a switching time between a reception and a transmission of a first node according to one embodiment of the present disclosure;

FIG. 10 illustrates a schematic diagram of a second delay according to one embodiment of the present disclosure;

FIG. 11 illustrates a schematic diagram of a first characteristic delay and a second characteristic delay according to one embodiment of the present disclosure;

FIG. 12 illustrates a schematic diagram of an information format adopted by physical layer information carried by a second signal according to one embodiment of the present disclosure;

FIG. 13 illustrates a structure block diagram of a processing device in a first node according to one embodiment of the present disclosure;

FIG. 14 illustrates a structure block diagram of a processing device in second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
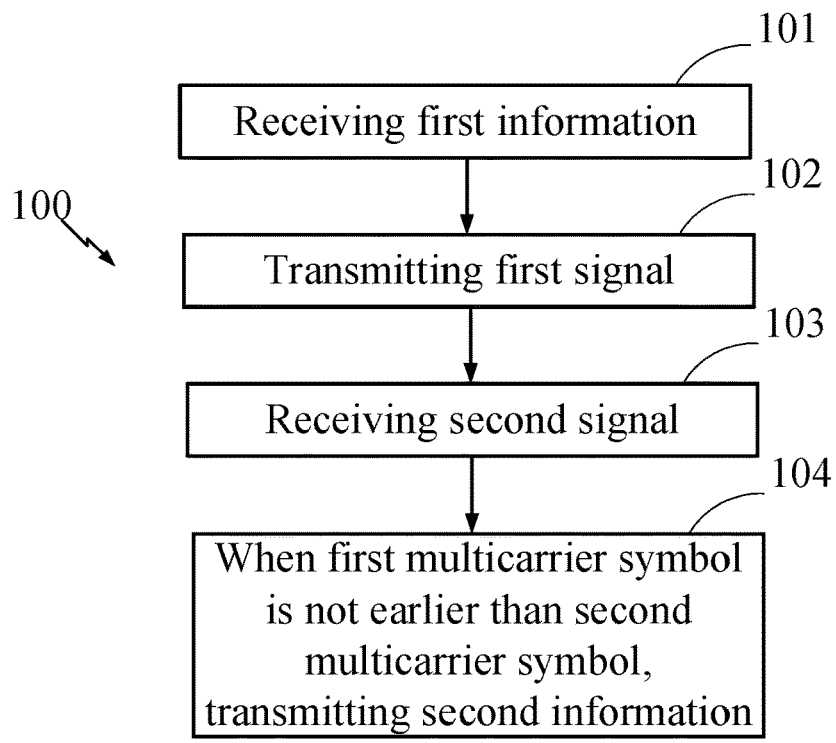
FIG. 1 illustrates a flowchart of first information, a first signal, a second signal and second information according to one embodiment of the present disclosure.

Embodiment 1 illustrates a flowchart of first information, a first signal, a second signal and second information according to one embodiment of the present disclosure, as shown in FIG. 1. In FIG. 1, each box represents a step. Particularly, the sequential order of steps in these boxes does not necessarily mean that the steps are chronologically arranged.

In embodiment 1, a first node in the present disclosure receives first information in step 101, the first information is used to determine a target time-frequency resource set, an earliest multicarrier symbol comprised in the target time-frequency resource set in time domain is a first multicarrier symbol, frequency-domain resources comprised in the target time-frequency resource set belong to a first frequency-domain resource pool; transmits a first signal in step 102, frequency-domain resources occupied by the first signal belong to a second frequency-domain resource pool, a frequency-domain relation between the first frequency-domain resource pool and the second frequency-domain resource pool is used to determine a reference delay; receives a second signaling step 103, a length of a time interval between a start time of a second multicarrier symbol and an end time for receiving the second signal is equal to the reference delay, the start time of the second multicarrier symbol is not earlier than the end time for receiving the second signal; when the first multicarrier symbol is not earlier than the second multicarrier symbol in step 104, transmits second information; herein, when the second information is transmitted, the target time-frequency resource set is used for a transmission of the second information; time-frequency resources occupied by the first signal are used to determine radio resources occupied by the second signal; information carried by the second signal is used to determine the second information, and a transmitter of the first information is different from a transmitter of the second signal.

In one embodiment, the first information is higher-layer information.

In one embodiment, the first information is transmitted through a higher-layer signaling.

In one embodiment, the first information is transmitted through a physical-layer signaling.

In one embodiment, the first information comprises all or part of a higher-layer signaling.

In one embodiment, the first information comprises all or part of a physical-layer signaling.

In one embodiment, the first information is transmitted via an air interface.

In one embodiment, the first information is transmitted via a radio interface.

In one embodiment, the first information is transmitted by the second node in the present disclosure to the first node in the present disclosure.

In one embodiment, the first information is transmitted through a Downlink (DL).

In one embodiment, the first information is transmitted via a Uu interface.

In one embodiment, the first information is transmitted inside the first node in the present disclosure.

In one embodiment, the first information is transferred from a higher layer of the first node in the present disclosure to a physical layer of the first node.

In one embodiment, the first information is configured.

In one embodiment, the first information is pre-configured.

In one embodiment, the first information comprises all or partial Information Elements (IEs) in a Radio Resource Control (RRC) signaling.

In one embodiment, the first information comprises all or partial fields in an IE in a RRC signaling.

In one embodiment, the first information comprises all or partial fields in a Medium Access Control (MAC) layer signaling.

In one embodiment, the first information is transmitted through a Downlink Shared Channel (DL-SCH).

In one embodiment, the first information is transmitted through a Physical Downlink Shared Channel (PDSCH).

In one embodiment, the first information is transmitted through a Physical Downlink Control Channel (PDCCH).

In one embodiment, the first information comprises all or partial fields of a Downlink Control Information (DCI) signaling.

In one embodiment, the first information is broadcast.

In one embodiment, the first information is unicast.

In one embodiment, the first information is Cell-Specific.

In one embodiment, the first information is UE-specific.

In one embodiment, the first information is UE group-specific.

In one embodiment, the first information is carried by the first signaling in the present disclosure.

In one embodiment, the first information is carried by a signaling other than the first signaling in the present disclosure.

In one embodiment, the first information comprises a field in the first signaling in the present disclosure.

In one embodiment, the first information comprises a "PUCCH-ResourceSet" IE.

In one embodiment, the first information comprises a "pucch-ResourceCommon" IE.

In one embodiment, the above phrase of "the first information being used to determine a target time-frequency resource set" includes the following meaning: the first information is used by the first node in the present disclosure to determine the target time-frequency resource set.

In one embodiment, the above phrase of "the first information being used to determine a target time-frequency resource set" includes the following meaning: the first information is used to directly indicate the target time-frequency resource set.

In one embodiment, the above phrase of "the first information being used to determine a target time-frequency resource set" includes the following meaning: the first information is used to indirectly indicate the target time-frequency resource set.

In one embodiment, the above phrase of "the first information being used to determine a target time-frequency resource set" includes the following meaning: the first information is used to explicitly indicate the target time-frequency resource set.

In one embodiment, the above phrase of "the first information being used to determine a target time-frequency resource set" includes the following meaning: the first information is used to implicitly indicate the target time-frequency resource set.

In one embodiment, the target time-frequency resource set is reserved for a Physical Uplink Control Channel (PUCCH) transmission.

In one embodiment, the target time-frequency resource set is reserved for Uplink Control Information (UCI).

In one embodiment, the target time-frequency resource set is reserved for a sidelink HARQ feedback.

In one embodiment, the target time-frequency resource set comprises at least one Resource Element (RE).

In one embodiment, the target time-frequency resource set comprises at least one time-domain continuous Orthogonal Frequency Division Multiplexing (OFDM) symbol in time domain.

In one embodiment, the target time-frequency resource set comprises more than one time-domain discrete OFDM symbol in time domain.

In one embodiment, the target time-frequency resource set comprises at least one Physical resource block (PRB) in frequency domain.

In one embodiment, the target time-frequency resource set comprises continuous frequency-domain resources in frequency domain.

In one embodiment, the target time-frequency resource set comprises discrete frequency-domain resources in frequency domain.

In one embodiment, the target time-frequency resource set comprises frequency-hopping frequency-domain resources in frequency domain.

In one embodiment, the first multicarrier symbol is an OFDM symbol.

In one embodiment, the first multicarrier symbol is a Discrete Fourier Transform-Spread Orthogonal Frequency Division Multiplexing (DFT-s-OFDM) symbol.

In one embodiment, the first multicarrier symbol comprises a Cyclic Prefix (CP).

In one embodiment, the first multicarrier symbol is an OFDM symbol corresponding to an SCS of a subcarrier in the first frequency-domain resource pool.

In one embodiment, the first multicarrier symbol is a DFT-s-OFDM symbol corresponding to an SCS of a subcarrier in the first frequency-domain resource pool.

In one embodiment, when the target time-frequency resource set only comprises one multicarrier symbol in time domain, the first multicarrier symbol is one multicarrier symbol comprised in the target time-frequency resource set in time domain.

In one embodiment, any multicarrier symbol comprised in the target time-frequency resource set in time domain is an OFDM symbol.

In one embodiment, any multicarrier symbol comprised in the target time-frequency resource set in time domain is a DFT-s-OFDM symbol.

In one embodiment, the above phrase of "an earliest multicarrier symbol comprised in the target time-frequency resource set in time domain being a first multicarrier symbol" includes the following meaning: a start time of the first multicarrier symbol is not later than a start time of any multicarrier symbol comprised in the target time-frequency resource set in time domain.

In one embodiment, the above phrase of "an earliest multicarrier symbol comprised in the target time-frequency resource set in time domain being a first multicarrier symbol" includes the following meaning: the target time-frequency resource comprises more than one multicarrier symbol in time domain, and a start time of the first multicarrier symbol is earlier than a start time of any multicarrier symbol other than the first multicarrier symbol comprised in the target time-frequency resource set in time domain.

In one embodiment, the first frequency-domain resource pool is a BWP.

In one embodiment, the first frequency-domain resource pool comprises at least one frequency-domain continuous Physical Resource Block (PRB).

In one embodiment, for a given SCS, the first frequency-domain resource pool comprises at least one frequency-domain continuous PRB.

In one embodiment, the first frequency-domain resource pool comprises continuous frequency-domain resources.

In one embodiment, the first frequency-domain resource pool is frequency-domain resources comprised in a PUCCH resource set.

In one embodiment, the first frequency-domain resource pool is an Uplink (UL) BWP.

In one embodiment, the first frequency-domain resource pool comprises frequency-domain resources other than frequency-domain resources comprised in the target time-frequency resource set.

In one embodiment, the first frequency-domain resource pool only comprises frequency-domain resources comprised in the target time-frequency resource set.

In one embodiment, SCSs of subcarriers comprised in the first frequency-domain resource pool are equal.

In one embodiment, each SCS comprised in the target time-frequency resource set in frequency domain is a subcarrier in the first frequency-domain resource pool.

In one embodiment, the above phrase of "the first information being used to determine a target time-frequency resource set" includes the following meaning: the first information is used to determine frequency-domain resources comprised in the target time-frequency resource set out of the first frequency-domain resource pool, and the first information is used to indicate a start OFDM symbol and a number of OFDM symbol(s) comprised in the target time-frequency resource set.

In one embodiment, the first signal is a baseband signal.

In one embodiment, the first signal is a Radio Frequency (RF) signal.

In one embodiment, the first signal is transmitted via an air interface.

In one embodiment, the first signal is transmitted via a radio interface.

In one embodiment, the first signal is transmitted via a PC5 interface.

In one embodiment, the first signal is transmitted via a Uu interface.

In one embodiment, the first signal is transmitted through sidelink.

In one embodiment, the first signal is used to carry a sidelink Transport Block (TB).

In one embodiment, the first signal is transmitted through a Sidelink Shared Channel (SL-SCH).

In one embodiment, the first signal is transmitted through a Physical Sidelink Shared Channel (PSSCH).

In one embodiment, the first signal comprises a reference signal.

In one embodiment, the first signal comprises a PSSCH and a Demodulation Reference Signal (DMRS).

In one embodiment, the first signal is transmitted through a Physical Sidelink Control Channel (PSCCH).

In one embodiment, the first signal carries Sidelink Control Information (SCI).

In one embodiment, the first signal is broadcast.

In one embodiment, the first signal is unicast.

In one embodiment, the first signal is groupcast.

In one embodiment, all or part of a TB is used to generate the first signal.

In one embodiment, all or part of a TB and a reference signal are used together to generate the first radio signal.

In one embodiment, all or partial bits in a TB sequentially goes through CRC Calculation, Channel Coding, Rate Matching, Scrambling, Modulation, Layer Mapping, Antenna Port Mapping, Mapping to Virtual Resource Blocks, Mapping from Virtual to Physical Resource Blocks, OFDM Baseband Signal Generation and Modulation and Upconversion to acquire the first signal.

In one embodiment, all or partial bits in a TB sequentially goes through CRC Calculation, Channel Coding, Rate Matching, Scrambling, Modulation, Layer Mapping, Antenna Port Mapping, Mapping to Virtual Resource Blocks, Mapping from Virtual to Physical Resource Blocks and OFDM Baseband Signal Generation to acquire the first signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Antenna Port Mapping, Mapping to Virtual Resource Blocks, Mapping from Virtual to Physical Resource Blocks, OFDM Baseband Signal Generation and Modulation and Upconversion to acquire the first signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Antenna Port Mapping, Mapping to Virtual Resource Blocks, Mapping from Virtual to Physical Resource Blocks and OFDM Baseband Signal Generation to acquire the first signal.

In one embodiment, all or partial bits in a payload of an SCI sequentially goes through CRC Calculation, Channel Coding, Rate Matching, Scrambling, Modulation, Mapping to Physical Resources, OFDM Baseband Signal Generation, and Modulation and Upconversion to acquire the first signal.

In one embodiment, all or partial bits in a payload of an SCI sequentially goes through CRC Calculation, Channel Coding, Rate Matching, Scrambling, Modulation, Mapping to Physical Resources and OFDM Baseband Signal Generation to acquire the first signal.

In one embodiment, frequency-domain resources occupied by the first signal belong to a sidelink resource pool.

In one embodiment, frequency-domain resources occupied by the first signal comprise at least one PRB.

In one embodiment, frequency-domain resources occupied by the first signal comprise at least one subchannel.

In one embodiment, frequency-domain resources occupied by the first signal are continuous in frequency domain.

In one embodiment, frequency-domain resources occupied by the first signal are discrete in frequency domain.

In one embodiment, the second frequency-domain resource pool is a BWP.

In one embodiment, the second frequency-domain resource pool comprises at least one frequency-domain continuous PRB.

In one embodiment, for a given SCS, the second frequency-domain resource pool comprises at least one frequency-domain continuous PRB.

In one embodiment, the second frequency-domain resource pool comprises continuous frequency-domain resources.

In one embodiment, the second frequency-domain resource pool is a sidelink resource pool.

In one embodiment, the second frequency-domain resource pool is a sidelink BWP.

In one embodiment, the second frequency-domain resource pool comprises frequency-domain resources other than frequency-domain resources occupied by the first signal.

In one embodiment, SCSs of subcarriers comprised in the second frequency-domain resource pool are equal.

In one embodiment, an SCS of a subcarrier comprised in the second frequency-domain resource pool is equal to an SCS of any subcarrier comprised in the first frequency-domain resource pool.

In one embodiment, there exist an SCS of a subcarrier in the second frequency-domain resource pool being not equal to an SCS of a subcarrier in the first frequency-domain resource pool.

In one embodiment, the second frequency-domain resource pool only comprises frequency-domain resources occupied by the first signal.

In one embodiment, each subcarrier comprised in frequency-domain resources occupied by the first signal is a subcarrier in the second frequency-domain resource pool.

In one embodiment, a frequency-domain relation between the first frequency-domain resource pool and the second frequency-domain resource pool refers to whether the first frequency-domain resource pool is the same as the second frequency-domain resource pool.

In one embodiment, a frequency-domain relation between the first frequency-domain resource pool and the second frequency-domain resource pool refers to whether a Start and Length Indicator Value (SLIV) of the first frequency-domain resource pool is the same as an SLIV of the second frequency-domain resource pool.

In one embodiment, a frequency-domain relation between the first frequency-domain resource pool and the second frequency-domain resource pool refers to whether a frequency-domain starting location and a bandwidth of the first frequency-domain resource pool are respectively the same as a frequency-domain starting location and a bandwidth of the second frequency-domain resource pool.

In one embodiment, a frequency-domain relation between the first frequency-domain resource pool and the second frequency-domain resource pool refers to whether a locationAndBandwidth parameter of the first frequency-domain resource pool is the same as a locationAndBandwidth parameter of the second frequency-domain resource pool.

In one embodiment, a frequency-domain relation between the first frequency-domain resource pool and the second frequency-domain resource pool refers to whether a lowest frequency comprised in the first frequency-domain resource pool and a bandwidth are respectively the same as a lowest frequency comprised in the second frequency-domain resource pool and a bandwidth.

In one embodiment, a frequency-domain relation between the first frequency-domain resource pool and the second frequency-domain resource pool refers to whether an SCS of a subcarrier comprised in the first frequency-domain resource pool is the same as an SCS of a subcarrier comprised in the second frequency-domain resource pool.

In one embodiment, a frequency-domain relation between the first frequency-domain resource pool and the second frequency-domain resource pool refers to whether a center frequency point of the first frequency-domain resource pool is the same as a center frequency point of the second frequency-domain resource pool.

In one embodiment, a frequency-domain relation between the first frequency-domain resource pool and the second frequency-domain resource pool refers to a frequency-domain interval between a center frequency point of the first frequency-domain resource pool and a center frequency point of the second frequency-domain resource pool in frequency domain.

In one embodiment, the above phrase of "a frequency-domain relation between the first frequency-domain resource pool and the second frequency-domain resource pool being used to determine a reference delay" includes the following meaning: a frequency-domain relation between the first frequency-domain resource pool and the second frequency-domain resource pool is used by the first node in the present disclosure to determine the reference delay.

In one embodiment, the above phrase of "a frequency-domain relation between the first frequency-domain resource pool and the second frequency-domain resource pool being used to determine a reference delay" includes the following meaning: a frequency-domain relation between the first frequency-domain resource pool and the second frequency-domain resource pool is used by the second node in the present disclosure to determine the reference delay.

In one embodiment, the above phrase of "a frequency-domain relation between the first frequency-domain resource pool and the second frequency-domain resource pool being used to determine a reference delay" includes the following meaning: a location relation between the first frequency-domain resource pool and the second frequency-domain resource pool in frequency domain is used to determine the reference delay.

In one embodiment, the above phrase of "a frequency-domain relation between the first frequency-domain resource pool and the second frequency-domain resource pool being used to determine a reference delay" includes the following meaning: the reference delay is in a linear relation with a length of a frequency-domain interval between a center frequency point of the first frequency-domain resource pool and a center frequency point of the second frequency-domain resource pool.

In one embodiment, the above phrase of "a frequency-domain relation between the first frequency-domain resource pool and the second frequency-domain resource pool being used to determine a reference delay" includes the following meaning: the reference delay is in a linear relation with a length of a frequency-domain interval between a lowest frequency of the first frequency-domain resource pool and a lowest frequency of the second frequency-domain resource pool.

In one embodiment, the above phrase of "a frequency-domain relation between the first frequency-domain resource pool and the second frequency-domain resource pool being used to determine a reference delay" refers to: a frequency-domain relation between the first frequency-domain resource pool and the second frequency-domain resource pool is used to determine the second delay in the present disclosure.

In one embodiment, the reference delay is measured by s.

In one embodiment, the reference delay is measured by ms.

In one embodiment, the reference delay is equal to a time length of at least one OFDM symbol.

In one embodiment, the reference delay is equal to a time length of at least one slot.

In one embodiment, the reference delay is equal to a positive integral multiple of Tc, where $Tc=1/(480000*4096)$ s.

In one embodiment, the reference delay is represented by a number of OFDM symbol(s).

In one embodiment, the reference delay is represented by a number of slot(s).

In one embodiment, the reference delay is equal to a time length of at least one OFDM symbol, and the OFDM symbol(s) corresponds(correspond) to an SCS of a subcarrier in the first frequency-domain resource pool.

In one embodiment, the reference delay is equal to a time length of at least one OFDM symbol, and the OFDM symbol(s) corresponds(correspond) to an SCS of a subcarrier in the second frequency-domain resource pool.

In one embodiment, the reference delay is equal to a time length of a positive integral number of OFDM symbol(s) other than an earliest OFDM symbol in a slot.

In one embodiment, the reference delay is equal to a time length of at least one slot corresponding to an SCS of a subcarrier comprised in the first frequency-domain resource pool.

In one embodiment, the reference delay is equal to a time length of at least one slot corresponding to an SCS of a subcarrier comprised in the second frequency-domain resource pool.

In one embodiment, the reference delay is related to a waveform adopted by a signal carrying the second information.

In one embodiment, the reference delay is related to whether a signal carrying the second information adopts an OFDM waveform or a DFT-s-OFDM waveform.

In one embodiment, the reference delay is related to whether transform precoding is adopted when a signal carrying the second information is generated.

In one embodiment, the second signal is a baseband signal.

In one embodiment, the second signal is an RF signal.

In one embodiment, the second signal is transmitted via an air interface.

In one embodiment, the second signal is transmitted via a radio interface.

In one embodiment, the second signal is transmitted via a PC5 interface.

In one embodiment, the second signal is transmitted via a Uu interface.

In one embodiment, the second signal is transmitted through sidelink.

In one embodiment, the second signal is transmitted through a PSFCH.

In one embodiment, all or partial a characteristic sequence is used to generate the second signal.

In one embodiment, all or partial a bit block is used to generate the second signal.

In one embodiment, all or partial a Zadoff-Chu (ZC) sequence is used to generate the second signal.

In one embodiment, the second signal carries all or partial Sidelink Feedback Control Information (SFCI).

In one embodiment, the second signal carries Channel Status Information (CSI) of sidelink.

In one subembodiment, the second signal carries a Channel Quality Indicator (CQI) of sidelink.

In one embodiment, the second signal carries a Rank Indicator (RI) of sidelink.

In one embodiment, the second signal carries a Reference Signal Received Power (RSRP) report of sidelink.

In one embodiment, the second signal carries a Reference Signal Received Quality (RSRQ) report of sidelink.

In one embodiment, the second signal carries a Layer 1-Reference Signal Received Power (L1-RSRP) report of sidelink.

In one embodiment, the second signal carries a HARQ feedback.

In one embodiment, the second signal carries a HARQ Non-Acknowledge (NACK) feedback.

In one embodiment, the second signal is used to determine whether the first signal is correctly received.

In one embodiment, the second signal is used to indicate whether the first signal is correctly received.

In one embodiment, the second signal is used to indicate that the first signal is not correctly received.

In one embodiment, the second signal carries a HARQ feedback carrying the first signal.

In one embodiment, the second signal carries a HARQ NACK feedback carrying the first signal.

In one embodiment, the second multicarrier symbol is an OFDM symbol.

In one embodiment, the second multicarrier symbol is a DFT-s-OFDM symbol.

In one embodiment, the second multicarrier symbol comprises a CP.

In one embodiment, the second multicarrier symbol is an OFDM symbol corresponding to an SCS of a subcarrier in the first frequency-domain resource pool.

In one embodiment, the second multicarrier symbol is a DFT-s-OFDM symbol corresponding to an SCS of a subcarrier in the first frequency-domain resource pool.

In one embodiment, the second multicarrier symbol is an OFDM symbol corresponding to an SCS of a subcarrier in the second frequency-domain resource pool.

In one embodiment, the second multicarrier symbol is a DFT-s-OFDM symbol corresponding to an SCS of a subcarrier in the second frequency-domain resource pool.

In one embodiment, the first multicarrier symbol and a second multicarrier symbol correspond to a same SCS.

In one embodiment, the second multicarrier symbol and the first multicarrier symbol are the same.

In one embodiment, the second multicarrier symbol and the first multicarrier symbol are different.

In one embodiment, the second multicarrier symbol is a virtual multicarrier symbol.

In one embodiment, the second multicarrier symbol is a multicarrier symbol actually occupied by the first node.

In one embodiment, the second multicarrier symbol is not occupied by the first node.

In one embodiment, the second multicarrier symbol is a multicarrier symbol used as a time reference.

In one embodiment, a start time of the second multicarrier symbol is a start time of a CP in the second multicarrier symbol.

In one embodiment, a start time of the second multicarrier symbol comprises an influence of a Timing Advance (TA).

In one embodiment, an end time for receiving the second signal is an end time for receiving a latest OFDM symbol occupied by the second signal.

In one embodiment, an end time for receiving the second signal is an end time for receiving a slot to which a latest OFDM symbol occupied by the second signal belongs.

In one embodiment, a start time of the second multicarrier symbol is later than an end time for receiving the second signal.

In one embodiment, a start time of the second multicarrier symbol is the same as an end time for receiving the second signal.

In one embodiment, the above phrase of "when the first multicarrier symbol is not earlier than the second multicarrier symbol, transmitting a second signaling" refers to: when a start time of the first multicarrier symbol is not earlier than a start time of the second multicarrier symbol, transmitting the second information.

In one embodiment, the above phrase of "when the first multicarrier symbol is not earlier than the second multicarrier symbol, transmitting a second signaling" refers to: when an end time of the first multicarrier symbol is not earlier than an end time of the second multicarrier symbol, transmitting the second information.

In one embodiment, the second information comprises physical-layer information.

In one embodiment, the second information comprises higher-layer information.

In one embodiment, the second information comprises partial or all UCI.

In one embodiment, the second information comprises one or a plurality of fields in UCI.

In one embodiment, the second information is transmitted through a Physical Uplink Control Channel.

In one embodiment, the second information is transmitted through a Physical Uplink Shared CHannel (PUSCH).

In one embodiment, the second information is piggybacked through a Physical Uplink Shared CHannel (PUSCH).

In one embodiment, the second information is transmitted through an Uplink Shared Channel (UL-SCH).

In one embodiment, the second information comprises all or partial bits in a HARQ-ACK codebook.

In one embodiment, the second information comprises a sidelink HARQ report.

In one embodiment, the second information comprises information on whether the first signal is correctly received.

In one embodiment, the second information comprises information on whether the first signal is not correctly received.

In one embodiment, the second information comprises information on whether a TB carried by the first signal needs to be retransmitted.

In one embodiment, the second information comprises information on whether a TB carried by the first signal needs to be re-scheduled.

In one embodiment, the second information comprises all or partial bits in a CSI feedback.

In one embodiment, the second information is carried by a baseband signal.

In one embodiment, the second information is carried by an RF signal.

In one embodiment, the second information is transmitted via an air interface.

In one embodiment, the second information is transmitted via a radio interface.

In one embodiment, the second information is transmitted via a Uu interface.

In one embodiment, the second information is transmitted through uplink.

In one embodiment, the second information is transferred from a physical layer of the first node to a higher layer of the first node.

In one embodiment, the second information is transmitted inside the first node.

In one embodiment, a sidelink HARQ feedback is used to determine the second information.

In one embodiment, a sidelink CSI feedback is used to determine the second information.

In one embodiment, a sidelink PHR feedback is used to determine the second information.

In one embodiment, the above phrase of "the target time-frequency resource set being used for a transmission of the second information" includes the following meaning: a radio signal occupying the target time-frequency resource set carries the second information.

In one embodiment, the above phrase of "the target time-frequency resource set being used for a transmission of the second information" includes the following meaning: a channel carrying the second information occupies the target time-frequency resource set.

In one embodiment, the above phrase of "the target time-frequency resource set being used for a transmission of the second information" includes the following meaning: the target time-frequency resource set is used by the first node in the present disclosure for a transmission of the second information.

In one embodiment, the above phrase of "the target time-frequency resource set being used for a transmission of the second information" includes the following meaning: time-frequency resources occupied by a channel carrying the second information belong to the target time-frequency resource set.

In one embodiment, radio resources occupied by the second signal comprise time-frequency resources occupied by the second signal and code-domain resources occupied by the second signal.

In one embodiment, radio resources occupied by the second signal comprise time-frequency resources occupied by the second signal.

In one embodiment, radio resources occupied by the second signal comprise code-domain resources occupied by the second signal.

In one embodiment, radio resources occupied by the second signal comprise time-frequency resources occupied by the second signal and sequence resources generating the second signal.

In one embodiment, radio resources occupied by the second signal comprise sequence resources generating the second signal.

In one embodiment, the above phrase of "time-frequency resources occupied by the first signal being used to determine radio resources occupied by the second signal" includes the following meaning: time-frequency resources occupied by the first signal are used by a first node in the present disclosure to determine radio resources occupied by the second signal.

In one embodiment, the above phrase of "time-frequency resources occupied by the first signal being used to determine radio resources occupied by the second signal" includes the following meaning: time-frequency resources occupied by the first signal are used to determine time-frequency resources occupied by the second signal.

In one embodiment, the above phrase of "time-frequency resources occupied by the first signal being used to determine radio resources occupied by the second signal" includes the following meaning: time-frequency resources occupied by the first signal are used to determine code-domain resources occupied by the second signal.

In one embodiment, the above phrase of "time-frequency resources occupied by the first signal being used to determine radio resources occupied by the second signal" includes the following meaning: time-frequency resources occupied by the first signal are used to determine sequence resources generating the second signal.

In one embodiment, the above phrase of "time-frequency resources occupied by the first signal being used to determine radio resources occupied by the second signal" includes the following meaning: time-frequency resources occupied by the first signal are used to determine time-frequency resources occupied by the second signal and sequence resources generating the second signal.

In one embodiment, the above phrase of "time-frequency resources occupied by the first signal being used to determine radio resources occupied by the second signal" includes the following meaning: time-frequency resources occupied by the first signal are used to determine time-frequency resources occupied by the second signal and code-domain resources occupied by the second signal.

In one embodiment, the above phrase of "time-frequency resources occupied by the first signal being used to determine radio resources occupied by the second signal" includes the following meaning: time-frequency resources occupied by the first signal are used to determine radio resources occupied by the second signal according to a mapping relation.

In one embodiment, the above phrase of "time-frequency resources occupied by the first signal being used to determine radio resources occupied by the second signal" includes the following meaning: time-frequency resources occupied by the first signal are used to determine radio resources occupied by the second signal according to a corresponding relation.

In one embodiment, the above phrase of "time-frequency resources occupied by the first signal being used to determine radio resources occupied by the second signal" includes the following meaning: time-frequency resources occupied by the first signal are used to determine radio resources occupied by the second signal according to an implicit relation.

In one embodiment, the above phrase of "time-frequency resources occupied by the first signal being used to determine radio resources occupied by the second signal" includes the following meaning: radio resources occupied by the second signal are associated with time-frequency resources occupied by the first signal.

In one embodiment, the phrase of "information carried by the second signal being used to determine the second information" includes the following meaning: the second information comprises information carried by the second signal.

In one embodiment, the phrase of "information carried by the second signal being used to determine the second information" includes the following meaning: the second information copies information carried by the second signal.

In one embodiment, the phrase of "information carried by the second signal being used to determine the second information" includes the following meaning: the second signal is used to determine whether the first signal is correctly received, and the second information comprises an indication of whether the first signal is correctly received.

In one embodiment, the phrase of "information carried by the second signal being used to determine the second information" includes the following meaning: information carried by the second information and information carried by the second signal are the same.

In one embodiment, the phrase of "information carried by the second signal being used to determine the second information" includes the following meaning: HARQ-ACK information carried by the second information and HARQ-ACK information carried by the second signal are the same.

In one embodiment, the phrase of "information carried by the second signal being used to determine the second information" includes the following meaning: the second information comprises HARQ-ACK information carried by the second signal.

In one embodiment, the phrase of "information carried by the second signal being used to determine the second information" includes the following meaning: information carried by the second signal is used to generate the second signal.

In one embodiment, the phrase of "information carried by the second signal being used to determine the second information" includes the following meaning: information carried by the second signal is used by the first node in the present disclosure to determine the second information.

In one embodiment, a transmitter of the first information is a base station.

In one embodiment, a transmitter of the first information is a Transmission Reception Point (TRP).

In one embodiment, a transmitter of the first information is a network device.

In one embodiment, a transmitter of the first information is gNB.

In one embodiment, a transmitter of the first information is eNB.

In one embodiment, a transmitter of the first information is a User Equipment (UE).

In one embodiment, a transmitter of the first information is a Road Side Unit (RSU).

In one embodiment, a transmitter of the first information is the first node in the present disclosure.

In one embodiment, a transmitter of the first information is the second node in the present disclosure.

In one embodiment, a transmitter of the second signal is a base station.

In one embodiment, a transmitter of the second signal is a network device.

In one embodiment, a transmitter of the second signal is a UE.

In one embodiment, a transmitter of the second signal is a Road Side Unit (RSU).

In one embodiment, a transmitter of the second signal is a node other than the second node in the present disclosure.

In one embodiment, a transmitter of the second signal is an OnBoard Unit (OBU).

In one embodiment, the above phrase of "a transmitter of the first information being different from a transmitter of the second signal" includes the following meaning: the first information and the second signal are transmitted via different air interfaces.

In one embodiment, the above phrase of "a transmitter of the first information being different from a transmitter of the second signal" includes the following meaning: the first information and the second signal are transmitted through different links.

In one embodiment, the above phrase of "a transmitter of the first information being different from a transmitter of the second signal" includes the following meaning: the first information is transmitted via a Uu interface, and the second signal is transmitted via a PC5 interface.

In one embodiment, the above phrase of "a transmitter of the first information being different from a transmitter of the second signal" includes the following meaning: the first information is transmitted through downlink, and the second signal is transmitted through sidelink.

In one embodiment, the above phrase of "a transmitter of the first information being different from a transmitter of the second signal" includes the following meaning: a transmitter of the first information and a transmitter of the second signal are non-co-located.

In one embodiment, the above phrase of "a transmitter of the first information being different from a transmitter of the second signal" includes the following meaning: node types of a transmitter of the first information and a transmitter of the second signal are different.

In one embodiment, the above phrase of "a transmitter of the first information being different from a transmitter of the second signal" includes the following meaning: a transmitter of the first information is a base station, and a transmitter of the second signal is a UE.

In one embodiment, the above phrase of "a transmitter of the first information being different from a transmitter of the second signal" includes the following meaning: a transmitter of the first information is a gNB/eNB, and a transmitter of the second signal is an RSU.

In one embodiment, also comprising:

transmitting a second signaling;

herein, the second signaling is used to indicate time-frequency resources occupied by the first signal and a Modulation Coding Scheme (MCS) adopted by the first signal.

Embodiment 2

Figure 2:
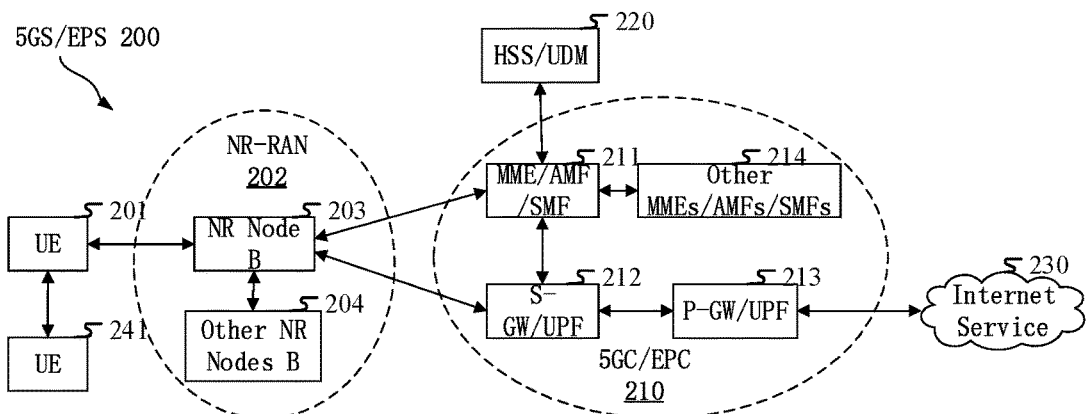
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 illustrates a network architecture 200 of 5G NR, Long-Term Evolution (LTE) and Long-Term Evolution Advanced (LTE-A) systems. The 5G NR or LIE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports transmission in a sidelink.

In one embodiment, the UE 201 supports a PC5 interface.

In one embodiment, the UE201 supports Internet of Vehicles.

In one embodiment, the UE201 supports V2X traffic.

In one embodiment, the gNB 201 corresponds to the second node in the present disclosure.

In one embodiment, the gNB 201 supports Internet of Vehicles.

In one embodiment, the gNB 201 supports V2X traffic.

Embodiment 3

Figure 3:
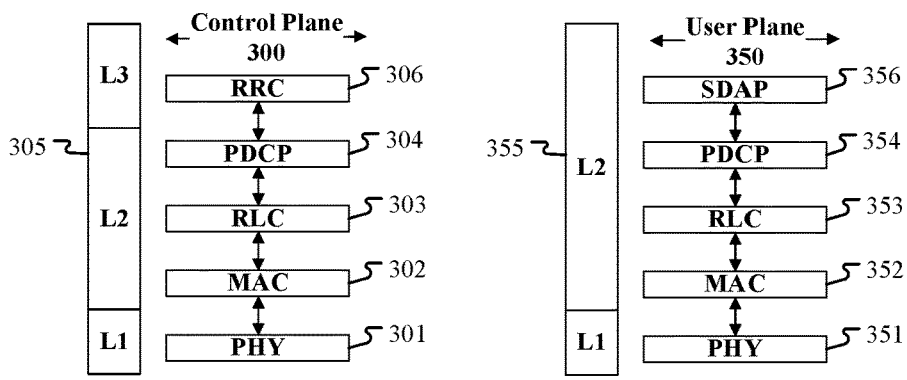
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or vehicle equipment or vehicle-mounted communication module in V2X) and a second node (gNB, UE or vehicle equipment or vehicle-mounted communication module in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node via the PHY 301. L2 305 comprises a MAC sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The RRC sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the first signal in the present disclosure is generated by the RRC 306.

In one embodiment, the first signal in the present disclosure is generated by the MAC 302 or the MAC 352.

In one embodiment, the first signal in the present disclosure is generated by the PHY 301 or the PHY 351.

In one embodiment, the second signal in the present disclosure is generated by the RRC 306.

In one embodiment, the second signal in the present disclosure is generated by the MAC 302 or the MAC 352.

In one embodiment, the second signal in the present disclosure is generated by the PHY 301 or the PHY 351.

In one embodiment, the second information in the present disclosure is generated by the RRC 306.

In one embodiment, the second information in the present disclosure is generated by the MAC 302 or the MAC 352.

In one embodiment, the second information in the present disclosure is generated by the PHY 301 or the PHY 351.

In one embodiment, the first signaling in the present disclosure is generated by the RRC 306.

In one embodiment, the first signaling in the present disclosure is generated by the MAC 302 or the MAC 352.

In one embodiment, the first signaling in the present disclosure is generated by the PHY 301 or the PHY 351.

In one embodiment, the third information in the present disclosure is generated by the RRC 306.

In one embodiment, the third information in the present disclosure is generated by the MAC 302 or the MAC 352.

In one embodiment, the third information in the present disclosure is generated by the PHY 301 or the PHY 351.

In one embodiment, the fourth information in the present disclosure is generated by the RRC 306.

In one embodiment, the fourth information in the present disclosure is generated by the MAC 302 or the MAC 352.

In one embodiment, the fourth information in the present disclosure is generated by the PHY 301 or the PHY 351.

Embodiment 4

Figure 4:
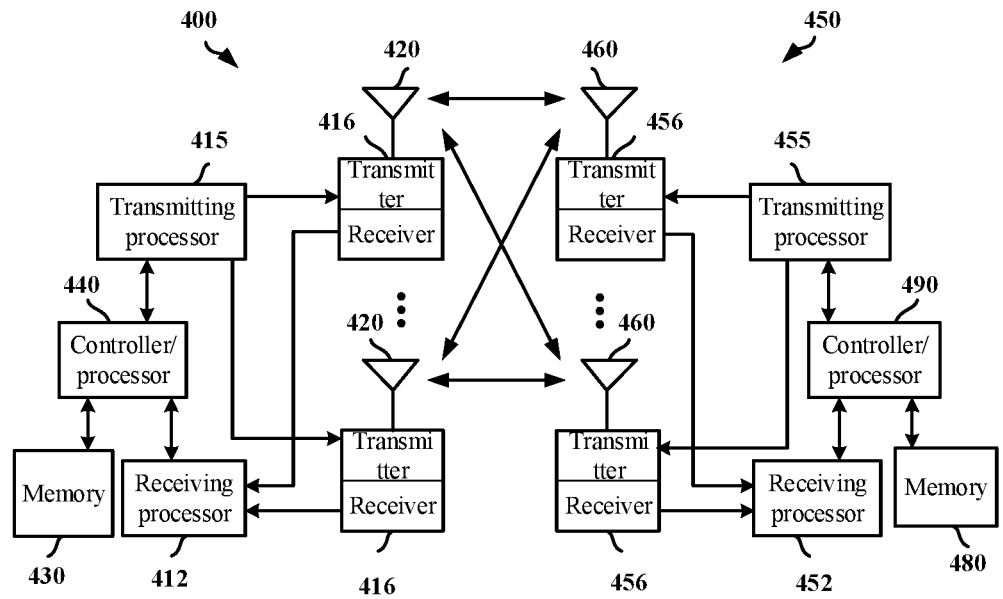
FIG. 4 illustrates a schematic diagram of a first node and a second node according to one embodiment of the present disclosure.

Embodiment 4 illustrates a schematic diagram of a first node and a second node according to the present disclosure, as shown in FIG. 4.

The first node (450) may comprise a controller/processor 490, a data source/buffer 480, a receiving processor 452, a transmitter/receiver 456 and a transmitting processor 455, wherein the transmitter/receiver 456 comprises an antenna 460.

The second node (410) may comprise a controller/processor 440, a data source/buffer 430, a receiving processor 412, a transmitter/receiver 416 and a transmitting processor 415, wherein the transmitter/receiver 416 comprises an antenna 420.

In Downlink, a higher-layer packet, such as high-layer information comprised in the first information, the first signaling (if higher-layer information is comprised in the first signaling), the third information and the fourth information in the present disclosure, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first node 450 based on varied priorities. The controller/processor 440 is also in charge of HARQ operation, retransmission of a lost packet, and a signaling to the first node 450, for instance, the first information, the first signaling (if higher layer information is comprised in the first signaling), the third information and the fourth information are all generated in the controller/processor 440. The transmitting processor 415 implements various signal processing functions on the L1 layer (i.e., physical layer), including coding, interleaving, scrambling, modulation, power control/distribution, precoding, and generation of a physical-layer control signaling, etc. The generation of physical-layer signals of the first information, the first signaling, the third information and the fourth information in the present disclosure are completed by the transmitting processor 415, and the transmitting processor 415 divides the generated modulation symbols into parallel streams and maps each stream to a corresponding multi-carrier subcarrier and/or a multi-carrier symbol, which are then transmitted in the form of a radio-frequency signal by the transmitting processor 415 mapping to the antenna 420 via the transmitter 416. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving processing functions include reception of physical layer signals of the first information, the first signaling, the third information and the fourth information of the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second node 410 on a physical channel, and the data or control signals are later provided to the controller/processor 490. The controller/processor 490 is in charge of the function of L2 layer and above layers, and the controller/processor 490 interprets the first information, the first signaling (if higher layer information is comprised in the first signaling), the third information and the fourth information in the present disclosure. The controller/processor can be connected to a memory 480 that stores program code and data. The memory 480 may be called a computer readable medium.

In UL transmission, the data source/memory 480 provides higher-layer data to the controller/processor 490. The data source/buffer 480 represents all protocol layers of the L2 layer and above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the second node 410. The controller/processor 490 is also in charge of HARQ operation, retransmission of a lost packet, and a signaling to the second node 410. The transmitting processor 455 provides various signal transmitting processing functions for the L1 layer (that is, PHY). The generation of the second information in the present disclosure is completed at the transmitting processor 415. The signal transmission processing functions include coding and interleaving so as to facilitate Forward Error Correction (FEC) at the UE 450 as well as modulation of baseband signals based on various modulation schemes (i.e., BPSK, QPSK). The modulated symbols are divided into parallel streams and each stream is mapped onto a corresponding multicarrier subcarrier and/or multicarrier symbol, which is later mapped from the transmitting processor 455 to the antenna 460 via the transmitter 456 to be transmitted in the form of RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 provides various signal receiving and processing functions for the L1 layer (i.e., PHY), including receiving and processing the second information in the present disclosure, the signal receiving and processing function includes acquisition of multi-carrier symbol streams, demodulation based on each modulation scheme (i.e., BPSK, QPSK), then the decoding and de-interleaving to recover data and/or node 450 on the PHY. The data and the control signal are then provided to the controller/processor 440. The controller/processor 440 implements functions of L2 layer. The controller/processor can be connected to a buffer 430 that stores program code and data. The buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives first information, the first information is used to determine a target time-frequency resource set, an earliest multicarrier symbol comprised in the target time-frequency resource set in time domain is a first multicarrier symbol, frequency-domain resources comprised in the target time-frequency resource set belong to a first frequency-domain resource pool; transmits a first signal, frequency-domain resources occupied by the first signal belong to a second frequency-domain resource pool, a frequency-domain relation between the first frequency-domain resource pool and the second frequency-domain resource pool is used to determine a reference delay; receives a second signal, a length of a time interval between a start time of a second multicarrier symbol and an end time for receiving the second signal is equal to the reference delay, the start time of the second multicarrier symbol is not earlier than the end time for receiving the second signal; when the first multicarrier symbol is not earlier than the second multicarrier symbol, transmits second information; herein, when the second information is transmitted, the target time-frequency resource set is used for a transmission of the second information; time-frequency resources occupied by the first signal are used to determine radio resources occupied by the second signal; information carried by the second signal is used to determine the second information, and a transmitter of the first information is different from a transmitter of the second signal.

In one embodiment, the first node 450 comprises a memory that stores a computer readable instruction program. The computer readable instruction program generates an action when executed by at least one processor. The action includes: receiving first information, the first information being used to determine a target time-frequency resource set, an earliest multicarrier symbol comprised in the target time-frequency resource set in time domain being a first multicarrier symbol, frequency-domain resources comprised in the target time-frequency resource set belonging to a first frequency-domain resource pool; transmitting a first signal, frequency-domain resources occupied by the first signal belonging to a second frequency-domain resource pool, a frequency-domain relation between the first frequency-domain resource pool and the second frequency-domain resource pool being used to determine a reference delay; receiving a second signal, a length of a time interval between a start time of a second multicarrier symbol and an end time for receiving the second signal being equal to the reference delay, the start time of the second multicarrier symbol being not earlier than the end time for receiving the second signal; when the first multicarrier symbol is not earlier than the second multicarrier symbol, transmitting second information; herein, when the second information is transmitted, the target time-frequency resource set is used for a transmission of the second information; time-frequency resources occupied by the first signal are used to determine radio resources occupied by the second signal; information carried by the second signal is used to determine the second information, and a transmitter of the first information is different from a transmitter of the second signal.

In one embodiment, the second node 410 comprises at least one processor and at least one memory. The at least one memory comprises computer program codes; the at least one memory and the computer program codes are configured to be used in collaboration with the at least one processor. The second node 410 at least: transmits first information and a first signaling, the first information is used to indicate a target time-frequency resource set, an earliest multicarrier symbol comprised in the target time-frequency resource set in time domain is a first multicarrier symbol, frequency-domain resources comprised in the target time-frequency resource set belong to a first frequency-domain resource pool; receives second information; wherein the first signaling is used to indicate time-frequency resources occupied by a first signal, frequency-domain resources occupied by the first signal belong to a second frequency-domain resource pool, a frequency-domain relation between the first frequency-domain resource pool and the second frequency-domain resource pool is used to determine a reference delay; time-frequency resources occupied by the first signal are used to indicate radio resources occupied by a second signal; a length of a time interval between a start time of a second multicarrier symbol and an end time for receiving the second signal is equal to the reference delay, the start time of the second multicarrier symbol is not earlier than the end time for receiving the second signal; the target time-frequency resource set is used for a transmission of the second information; information carried by the second signal is used to determine the second information, and a transmitter of the second signal is a node other than the second node; the first multicarrier symbol is not earlier than the second multicarrier symbol.

In one embodiment, the second node 410 comprises a memory that stores a computer readable instruction program. The computer readable instruction program generates an action when executed by at least one processor. The action includes: transmitting first information and a first signaling, the first information being used to indicate a target time-frequency resource set, an earliest multicarrier symbol comprised in the target time-frequency resource set in time domain being a first multicarrier symbol, frequency-domain resources comprised in the target time-frequency resource set belonging to a first frequency-domain resource pool; and receiving second information; wherein the first signaling is used to indicate time-frequency resources occupied by a first signal, frequency-domain resources occupied by the first signal belong to a second frequency-domain resource pool, a frequency-domain relation between the first frequency-domain resource pool and the second frequency-domain resource pool is used to determine a reference delay; time-frequency resources occupied by the first signal are used to indicate radio resources occupied by a second signal; a length of a time interval between a start time of a second multicarrier symbol and an end time for receiving the second signal is equal to the reference delay, the start time of the second multicarrier symbol is not earlier than the end time for receiving the second signal; the target time-frequency resource set is used for a transmission of the second information; information carried by the second signal is used to determine the second information, and a transmitter of the second signal is a node other than the second node; the first multicarrier symbol is not earlier than the second multicarrier symbol.

In one embodiment, the first node 450 is a UE.

In one embodiment, the first node 450 is a UE that supports V2X.

In one embodiment, the first node 450 is a vehicle equipment.

In one embodiment, the first node 450 is a Road Side Unit (RSU) device.

In one embodiment, the second node 410 is a base station (gNB/eNB).

In one embodiment, the second node 410 is a base station that supports V2X.

In one embodiment, the receiver 456 (including the antenna 460), the receiving processor 452 and the controller/processor 490 are used to receive the first information in the present disclosure.

In one embodiment, the transmitter 456 (including the antenna 460), the transmitting processor 455 and the controller/processor 490 are to transmit the second information in the present disclosure.

In one embodiment, the receiver 456 (including the antenna 460), the receiving processor 452 and the controller/processor 490 are used to receive the first signaling in the present disclosure.

In one embodiment, the receiver 456 (including the antenna 460), the receiving processor 452 and the controller/processor 490 are used to receive the third information in the present disclosure.

In one embodiment, the receiver 456 (including the antenna 460), the receiving processor 452 and the controller/processor 490 are used to receive the fourth information in the present disclosure.

In one embodiment, the transmitter 416 (including the antenna 420), the transmitting processor 415 and the controller/processor 440 are used to transmit the first information in the present disclosure.

In one embodiment, the receiver 416 (including the antenna 420), the receiving processor 412 and the controller/processor 440 are used to receive the second information in the present disclosure.

In one embodiment, the transmitter 416 (including the antenna 420), the transmitting processor 415 and the controller/processor 440 are used to transmit the first signaling in the present disclosure.

In one embodiment, the transmitter 416 (including the antenna 420), the transmitting processor 415 and the controller/processor 440 are used to transmit the third information in the present disclosure.

In one embodiment, the transmitter 416 (including the antenna 420), the transmitting processor 415 and the controller/processor 440 are used to transmit the fourth information in the present disclosure.

Embodiment 5

Figure 5:
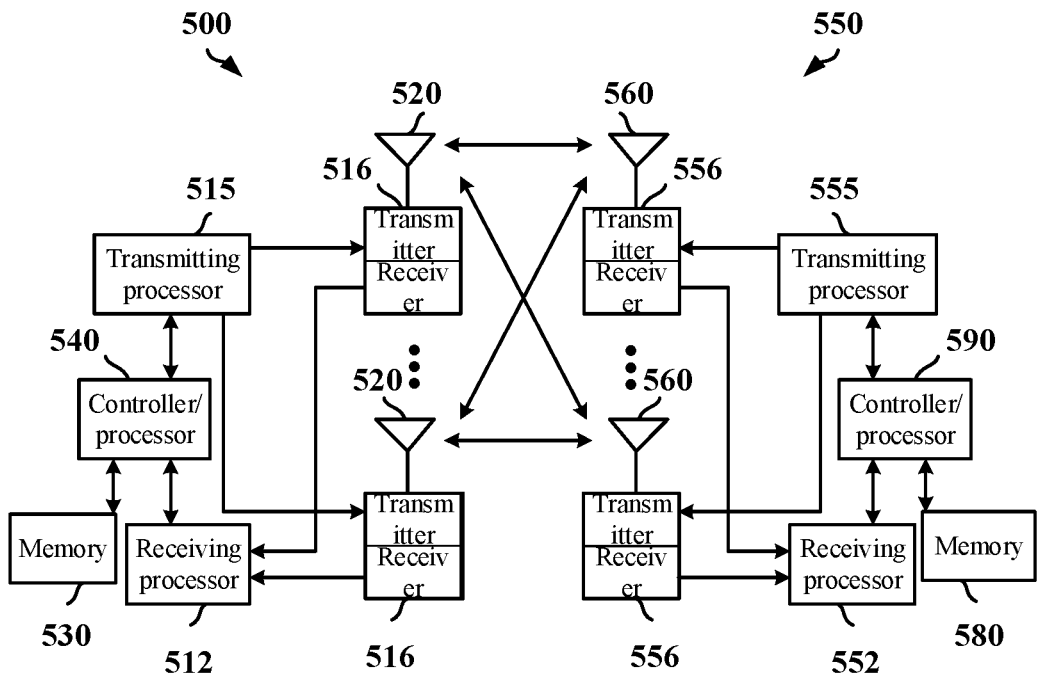
FIG. 5 illustrates a schematic diagram of a first node and another UE according to one embodiment of the present disclosure.

Embodiment 5 illustrates a schematic diagram of a first node and another UE according to the present disclosure, as shown in FIG. 5.

The first node (550) comprises a controller/processor 590, a memory 580, a receiving processor 552, a transmitter/receiver 556, and a transmitting processor 555, the transmitter/receiver 556 comprising an antenna 560. Composition in the another UE (500) is the same as that in the first node 550.

In sidelink transmission, a higher layer packet (comprising a first signal in the present disclosure) is provided to the controller/processor 590, which implements function of L2 layer. In sidelink transmission, the controller/processor 590 provides header compression, encryption, packet segmentation and reordering, and multiplexing between a logical channel and a transport channel. The controller/processor 590 is also responsible for HARQ operation (if supported), repeated transmission, and a signaling to the first-type communication node 500. The transmitting processor 555 implements various signal processing functions for L1 layer (that is, physical layer), comprising coding, interleaving, scrambling, modulation, power control/distribution, precoding and generation of physical layer control signaling, generation of the first signal in the present disclosure is completed at the transmitting processor 555. The modulated symbols are divided into parallel streams and each stream is mapped onto a corresponding multicarrier subcarrier and/or multicarrier symbol, which is later mapped from the transmitting processor 555 to the antenna 560 via the transmitter 556 to be transmitted in the form of RF signal. At the receiving side, each receiver 516 receives an RF signal via a corresponding antenna 520, each receiver 516 recovers baseband information modulated to the RF carrier and provides the baseband information to the receiving processor 512. The receiving processor 512 performs signal receiving processing functions of the L1 layer. The signal receiving and processing function includes receiving a first signal in the present disclosure, demodulating based on various modulation schemes (e.g., BPSK, and QPSK) via a multi-carrier symbol in a multicarrier symbol stream, then descrambling, decoding and de-interleaving to recover a data or a control signal transmitted by the first communication node 550 on a physical channel, and providing the data and the control signal to the controller/processor 540. The controller/processor 540 implements the functionality of the L2 layer, the controller/processor 540 interprets the first signal of the present disclosure. The controller/processor can be connected to a memory 530 that stores program code and data. The memory 530 may be called a computer readable medium. In particular, the second signal in the present disclosure, is generated at the transmitting processor 515 in the UE 500, which is later mapped to the antenna 520 via the transmitter 516 to be transmitted in the form of an RF signal. At the receiving end, each receiver 556 receives the RF signal of the second signal via its corresponding antenna 560, each receiver 556 recovers the baseband information modulated onto the RF carrier and provides the baseband information to the receiving processor 552, and the receiving processor 552 interprets the second signal in the present disclosure.

In one embodiment, the transmitter 556 (including the antenna 560), the transmitting processor 555 and the controller/processor 590 are to transmit the first signal in the present disclosure.

In one embodiment, the receiver 556 (including the antenna 560) and the receiving processor 552 are used to receive the second signal in the present disclosure.

In one embodiment, the receiver 516 (including the antenna 520), the receiving processor 512 and the controller/processor 540 are used to receive the first signal in the present disclosure.

In one embodiment, the transmitter 516 (including the antenna 520), the transmitting processor 515 and the controller/processor 540 are used to transmit the second signal in the present disclosure.

Embodiment 6

Figure 6:
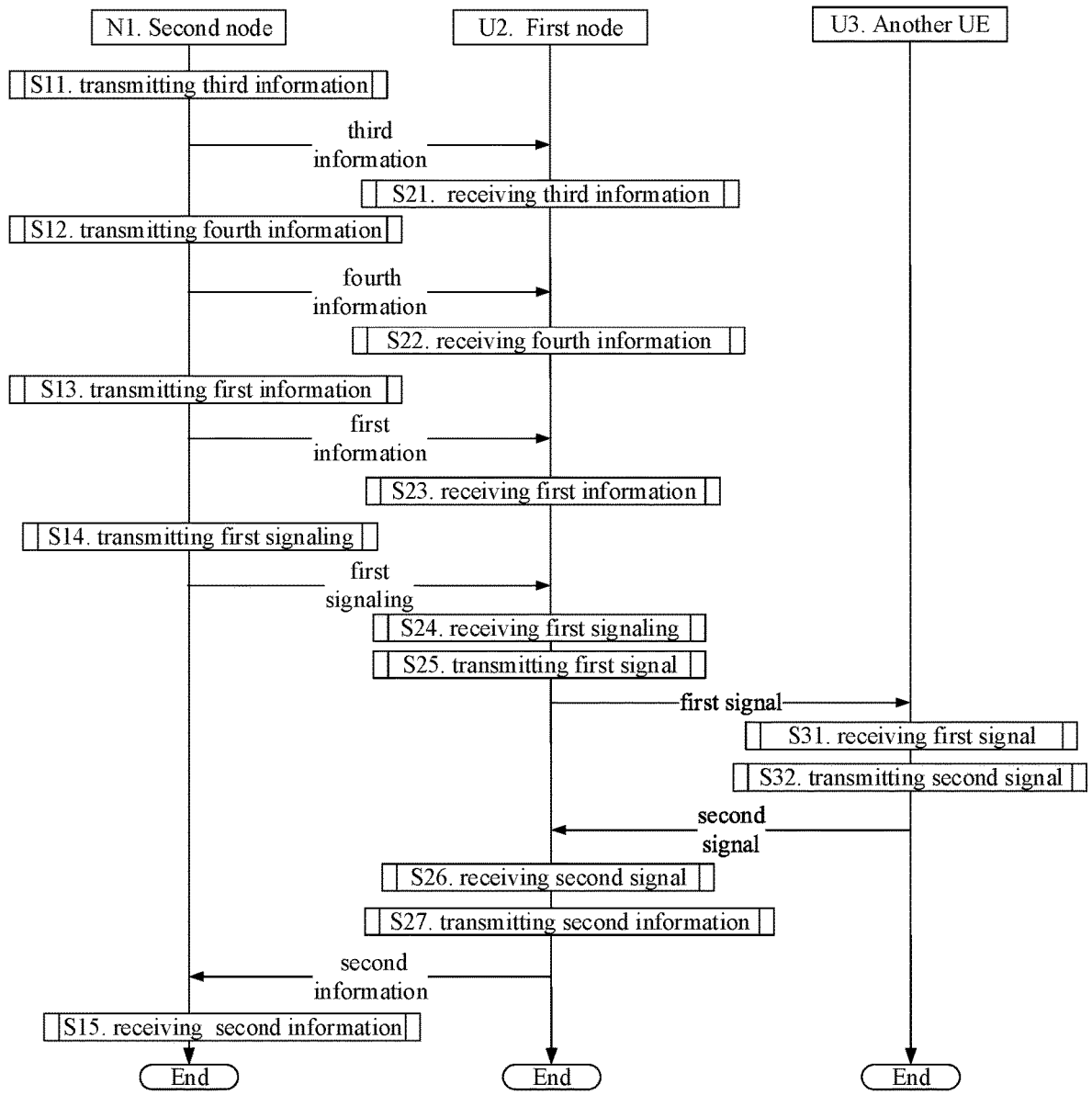
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a second node N1 is a maintenance base station of a serving cell of a first node U2, the first node U2 and another UE U3 are in communications via sidelink, and steps in dotted boxes are optional. It is particularly underlined that the order illustrated in the embodiment does not put constraints over sequences of signal transmissions and implementations.

The second node N1 transmits third information in step S11, transmits fourth information in step S12, transmits first information in step S13, transmits a first signaling in step S14, and receives second information in step S15.

The first node U2 receives third information in step S21, receives fourth information in step S22, receives first information in step S23, receives a first signaling in step S24, transmits a first signal in step S25, receives a second signal in step S26, and transmits second information in step S27.

Another UE U3 receives a first signal in step S31 and transmits a second signal in step S32.

In embodiment 6, the first information in the present disclosure is used to determine a target time-frequency resource set, an earliest multicarrier symbol comprised in the target time-frequency resource set in time domain is a first multicarrier symbol, frequency-domain resources comprised in the target time-frequency resource set belong to a first frequency-domain resource pool; frequency-domain resources occupied by the first signal in the present disclosure belong to a second frequency-domain resource pool, a frequency-domain relation between the first frequency-domain resource pool and the second frequency-domain resource pool is used to determine a reference delay; a length of a time interval between a start time of a second multicarrier symbol and an end time for receiving the second signal in the present disclosure is equal to the reference delay, the start time of the second multicarrier symbol is not earlier than the end time for receiving the second signal; the target time-frequency resource set is used for a transmission of the second information in the present disclosure; time-frequency resources occupied by the first signal are used to determine radio resources occupied by the second signal; information carried by the second signal is used to determine the second information, and a transmitter of the first information is different from a transmitter of the second signal; the first signaling is used to determine time-frequency resources occupied by the first signal, the first signaling is used to determine a length of a time interval between a start time of the first multicarrier symbol and an end time for receiving the first signaling; the third information is used to determine the first frequency-domain resource pool and an SCS of a subcarrier comprised in the first frequency-domain resource pool, and the fourth information is used to determine the second frequency-domain resource pool and an SCS of a subcarrier comprised in the second frequency-domain resource pool.

In one embodiment, the third information is higher-layer information.

In one embodiment, the third information is transmitted through a higher-layer signaling.

In one embodiment, the third information is transmitted through a physical-layer signaling.

In one embodiment, the third information comprises all or part of a higher-layer signaling.

In one embodiment, the third information comprises all or part of a physical-layer signaling.

In one embodiment, the third information comprises all or partial IEs in an RRC signaling.

In one embodiment, the third information comprises all or partial fields in an IE in an RRC signaling.

In one embodiment, the third information comprises all or partial fields in a MAC layer signaling.

In one embodiment, the third information comprises all or part of a MAC Control Element (CE).

In one embodiment, the third information comprises all or part of a MAC Header.

In one embodiment, the third information comprises all or part of a Random Access Response (RAR) MAC payload.

In one embodiment, the third information comprises all or part of Msg2 in random access procedure.

In one embodiment, the third information comprises all or part of MsgB in random access procedure.

In one embodiment, the third information is transmitted through a Downlink Shared Channel (DL-SCH).

In one embodiment, the third information is transmitted through a Physical Downlink Shared Channel (PDSCH).

In one embodiment, the third information is broadcast.

In one embodiment, the third information is unicast.

In one embodiment, the third information is Cell-Specific.

In one embodiment, the third information is UE-specific.

In one embodiment, the third information is UE group-specific.

In one embodiment, the third information is transmitted through a PDCCH.

In one embodiment, the third information comprises all or partial fields of a DCI signaling.

In one embodiment, the third information comprises a "BWP-Uplink" IE.

In one embodiment, the third information comprises an "initialUplinkBWP" IE.

In one embodiment, the above phrase of "the third information being used to determine the first frequency-domain resource pool and an SCS of a subcarrier comprised in the first frequency-domain resource pool" includes the following meaning: the third information is used by the first node in the present disclosure to determine the first frequency-domain resource pool and an SCS of a subcarrier comprised in the first frequency-domain resource pool.

In one embodiment, the above phrase of "the third information being used to determine the first frequency-domain resource pool and an SCS of a subcarrier comprised in the first frequency-domain resource pool" includes the following meaning: the third information is used to directly indicate the first frequency-domain resource pool and an SCS of a subcarrier comprised in the first frequency-domain resource pool.

In one embodiment, the above phrase of "the third information being used to determine the first frequency-domain resource pool and an SCS of a subcarrier comprised in the first frequency-domain resource pool" includes the following meaning: the third information is used to indirectly indicate the first frequency-domain resource pool and an SCS of a subcarrier comprised in the first frequency-domain resource pool.

In one embodiment, the above phrase of "the third information being used to determine the first frequency-domain resource pool and an SCS of a subcarrier comprised in the first frequency-domain resource pool" includes the following meaning: the third information is used to explicitly indicate the first frequency-domain resource pool and an SCS of a subcarrier comprised in the first frequency-domain resource pool.

In one embodiment, the above phrase of "the third information being used to determine the first frequency-domain resource pool and an SCS of a subcarrier comprised in the first frequency-domain resource pool" includes the following meaning: the third information is used to implicitly indicate the first frequency-domain resource pool and an SCS of a subcarrier comprised in the first frequency-domain resource pool.

In one embodiment, the fourth information is higher-layer information.

In one embodiment, the fourth information is transmitted through a higher-layer signaling.

In one embodiment, the fourth information is transmitted through a physical-layer signaling.

In one embodiment, the fourth information comprises all or part of a higher-layer signaling.

In one embodiment, the fourth information comprises all or part of a physical-layer signaling.

In one embodiment, the fourth information comprises all or partial IEs in an RRC signaling.

In one embodiment, the fourth information comprises all or partial fields in an IE in a RRC signaling.

In one embodiment, the fourth information comprises all or partial fields in a MAC layer signaling.

In one embodiment, the fourth information comprises all or part of a MAC Control Element (CE).

In one embodiment, the fourth information comprises all or part of a MAC Header.

In one embodiment, the fourth information is transmitted through a Downlink Shared Channel (DL-SCH).

In one embodiment, the fourth information is transmitted through a Physical Downlink Shared Channel (PDSCH).

In one embodiment, the fourth information is broadcast.

In one embodiment, the fourth information is unicast.

In one embodiment, the fourth information is Cell-Specific.

In one embodiment, the fourth information is UE-specific.

In one embodiment, the fourth information is UE group-specific.

In one embodiment, the fourth information is transmitted through a PDCCH.

In one embodiment, the fourth information comprises all or partial fields of a DCI signaling.

In one embodiment, the fourth information comprises a "BWP-Sidelink" IE.

In one embodiment, the fourth information comprises an "initialSidelinkBWP" IE.

In one embodiment, the fourth information comprises a "BWP-SidelinkCommon" IE.

In one embodiment, the fourth information comprises a "BWP-UplinkDedicated" IE.

In one embodiment, the third information and the fourth information are carried by two different RRC signalings.

In one embodiment, the third information and the fourth information are carried by a same RRC signaling.

In one embodiment, two IEs of a same RRC signaling respectively carry the third information and the fourth information.

In one embodiment, two fields in a same IE of a same RRC signaling respectively carry the third information and the fourth information.

Embodiment 7

Figure 7:
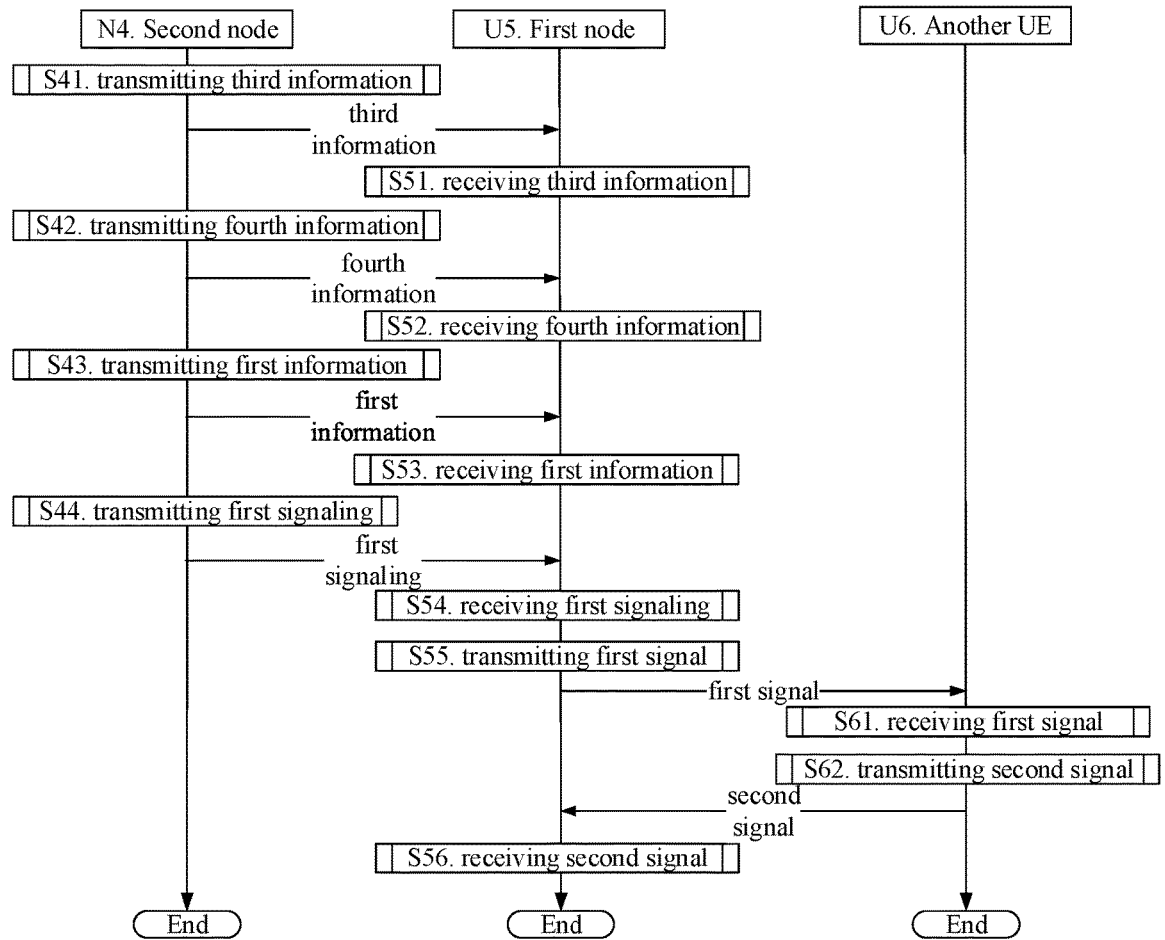
FIG. 7 illustrates a flowchart of radio signal transmission according to another embodiment of the present disclosure.

Embodiment 7 illustrates a flowchart of radio signal transmission according to one embodiment of the present disclosure, as shown in FIG. 7. In FIG. 7, a second node N4 is a maintenance base station of a serving cell of a first node U5, the first node U5 and another UE U6 are in communications via sidelink, and steps in dotted boxes are optional. It is particularly underlined that the order illustrated in the embodiment does not put constraints over sequences of signal transmissions and implementations.

The second node N4 transmits third information in step S41, transmits fourth information in step S42, transmits first information in step S43, and transmits a first signaling in step S44.

The first node U5 receives third information in step S51, receives fourth information in step S52, receives first information in step S53, receives a first signaling in step S54, transmits a first signal in step S55 and receives a second signal in step S56.

Another UE U6 receives a first signal in step S61, and transmits a second signal in step S62.

In embodiment 7, the first information in the present disclosure is used to determine a target time-frequency resource set, an earliest multicarrier symbol comprised in the target time-frequency resource set in time domain is a first multicarrier symbol, frequency-domain resources comprised in the target time-frequency resource set belong to a first frequency-domain resource pool; frequency-domain resources occupied by the first signal in the present disclosure belong to a second frequency-domain resource pool, a frequency-domain relation between the first frequency-domain resource pool and the second frequency-domain resource pool is used to determine a reference delay; a length of a time interval between a start time of a second multicarrier symbol and an end time for receiving the second signal in the present disclosure is equal to the reference delay, the start time of the second multicarrier symbol is not earlier than the end time for receiving the second signal; time-frequency resources occupied by the first signal are used to determine radio resources occupied by the second signal; a transmitter of the first information is different from a transmitter of the second signal; the first signaling is used to determine time-frequency resources occupied by the first signal, the first signaling is used to determine a length of a time interval between a start time of the first multicarrier symbol and an end time for receiving the first signaling; the third information is used to determine the first frequency-domain resource pool and an SCS of a subcarrier comprised in the first frequency-domain resource pool, and the fourth information is used to determine the second frequency-domain resource pool and an SCS of a subcarrier comprised in the second frequency-domain resource pool.

In one embodiment, the first signaling is a baseband signal.

In one embodiment, the first signaling is an RF signal.

In one embodiment, the first signaling is transmitted via an air interface.

In one embodiment, the first signaling is transmitted via a radio interface.

In one embodiment, the first signaling is transmitted via a PC5 interface.

In one embodiment, the first signaling is transmitted via a Uu interface.

In one embodiment, the first signaling is transmitted through sidelink.

In one embodiment, the first signaling is transmitted through downlink.

In one embodiment, the first signaling is a physical-layer signaling.

In one embodiment, the first signaling is a dynamic signaling.

In one embodiment, the first signaling carries DCI.

In one embodiment, the first signaling carries SCI.

In one embodiment, the first signaling is a PDCCH.

In one embodiment, the first signaling is a PSCCH.

In one embodiment, the first signaling is UE-specific.

In one embodiment, the first signaling is Cell-Specific.

In one embodiment, the first signaling is transmitted through a PDCCH scrambled by a UE-Specific Radio Network Temporary Identity (RNTI).

In one embodiment, the first signaling is transmitted through a PDCCH scrambled by an SL-SPS-V-RNTI.

In one embodiment, the first signaling is transmitted through a PDCCH scrambled by an SL-V-RNTI.

In one embodiment, the first signaling is transmitted via an air interface.

In one embodiment, the first signaling is transmitted via a radio interface.

In one embodiment, the first signaling is transmitted via a PC5 interface.

In one embodiment, the first signaling is transmitted via a Uu interface.

In one embodiment, the first signaling is transmitted through sidelink.

In one embodiment, the first signaling is carried by a baseband signal.

In one embodiment, the first signaling is carried by an RF signal.

In one embodiment, the first signaling is an RRC signaling.

In one embodiment, the first signaling is a higher-layer signaling.

In one embodiment, a DCI format adopted by the first signaling is format 3.

In one embodiment, the first signaling is used to configure sidelink transmission.

In one embodiment, the above phrase of "the first signaling being used to determine time-frequency resources occupied by the first signal" includes the following meaning: the first signaling is used by the first node in the present disclosure to determine time-frequency resources occupied by the first signal.

In one embodiment, the above phrase of "the first signaling being used to determine time-frequency resources occupied by the first signal" includes the following meaning: the first signaling is used to directly indicate time-frequency resources occupied by the first signal.

In one embodiment, the above phrase of "the first signaling being used to determine time-frequency resources occupied by the first signal" includes the following meaning: the first signaling is used to indirectly indicate time-frequency resources occupied by the first signal.

In one embodiment, the above phrase of "the first signaling being used to determine time-frequency resources occupied by the first signal" includes the following meaning: the first signaling is used to explicitly indicate time-frequency resources occupied by the first signal.

In one embodiment, the above phrase of "the first signaling being used to determine time-frequency resources occupied by the first signal" includes the following meaning: the first signaling is used to implicitly indicate time-frequency resources occupied by the first signal.

In one embodiment, the first signaling is also used to determine a Modulation Coding Scheme (MCS) adopted by the first signal.

In one embodiment, the first signaling is also used to determine a HARQ process to which the first signal belongs.

In one embodiment, the above phrase of "the first signaling being used to determine a length of a time interval between a start time of the first multicarrier symbol and an end time for receiving the first signaling" includes the following meaning: the first signaling is used by the first node in the present disclosure to determine a length of a time interval between a start time of the first multicarrier symbol and an end time for receiving the first signaling.

In one embodiment, the above phrase of "the first signaling being used to determine a length of a time interval between a start time of the first multicarrier symbol and an end time for receiving the first signaling" includes the following meaning: the first signaling is used to directly indicate a length of a time interval between a start time of the first multicarrier symbol and an end time for receiving the first signaling.

In one embodiment, the above phrase of "the first signaling being used to determine a length of a time interval between a start time of the first multicarrier symbol and an end time for receiving the first signaling" includes the following meaning: the first signaling is used to indirectly indicate a length of a time interval between a start time of the first multicarrier symbol and an end time for receiving the first signaling.

In one embodiment, the above phrase of "the first signaling being used to determine a length of a time interval between a start time of the first multicarrier symbol and an end time for receiving the first signaling" includes the following meaning: the first signaling is used to explicitly indicate a length of a time interval between a start time of the first multicarrier symbol and an end time for receiving the first signaling.

In one embodiment, the above phrase of "the first signaling being used to determine a length of a time interval between a start time of the first multicarrier symbol and an end time for receiving the first signaling" includes the following meaning: the first signaling is used to implicitly indicate a length of a time interval between a start time of the first multicarrier symbol and an end time for receiving the first signaling.

In one embodiment, the above phrase of "the first signaling being used to determine a length of a time interval between a start time of the first multicarrier symbol and an end time for receiving the first signaling" includes the following meaning: the first signaling is used to determine a length of a time interval between a start time of the first multicarrier symbol and an end time of a latest multicarrier symbol occupied by the first signaling.

In one embodiment, the above phrase of "the first signaling being used to determine a length of a time interval between a start time of the first multicarrier symbol and an end time for receiving the first signaling" includes the following meaning: the first signaling is used to determine a length of a time interval between a start time of a slot to which the first multicarrier symbol belongs and an end time of a slot to which a latest multicarrier symbol occupied by the first signaling belongs.

Embodiment 8

Figure 8:
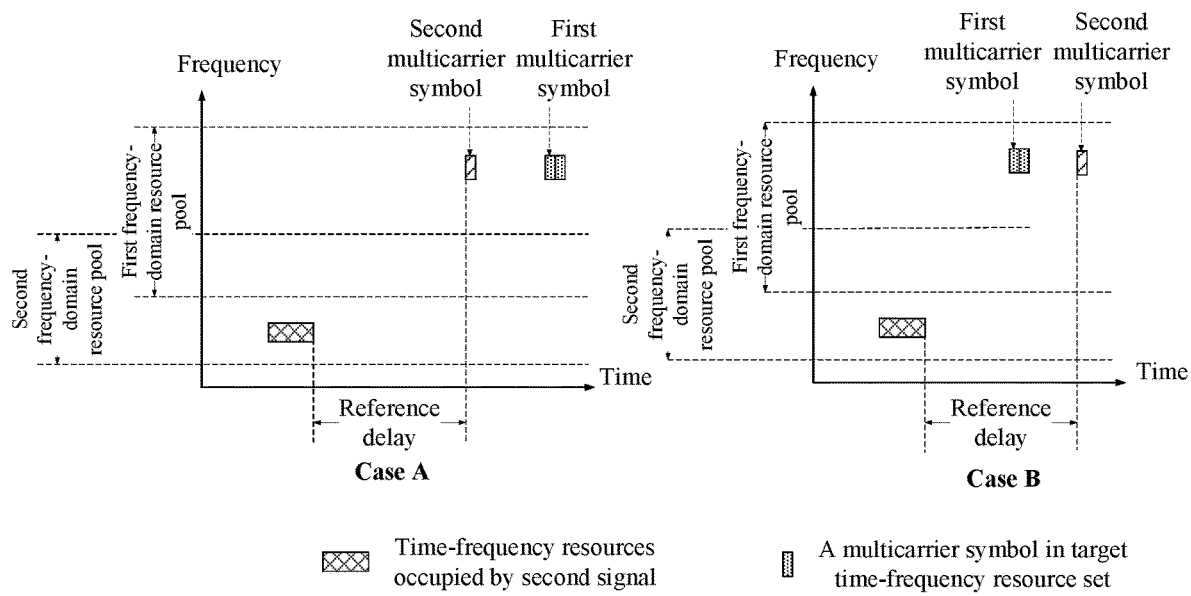
FIG. 8 illustrates a schematic diagram of a relation between a first multicarrier symbol and a second multicarrier symbol according to one embodiment of the present disclosure.

Embodiment 8 illustrates a schematic diagram of a relation between a first multicarrier symbol and a second multicarrier symbol according to one embodiment of the present disclosure, as shown in FIG. 8. In FIG. 8, in each case, the horizontal axis represents time, the vertical axis represents frequency, the cross-line filled rectangle represents time-frequency resources occupied by a second signal, each dot-filled rectangle represents a multicarrier symbol in a target time-frequency resource set, and the slash-filled rectangle represents a second multicarrier symbol; in case A, a first multicarrier symbol is not earlier than a second multicarrier symbol; and in case B, a first multicarrier symbol is earlier than a second multicarrier symbol.

In embodiment 8, when the first multicarrier symbol in the present disclosure is earlier than the second multicarrier symbol in the present disclosure, the first node in the present disclosure may drop transmitting the second information, or the first node may ignore the first information, or the first node device may assume the target time-frequency resource set in the present disclosure invalid.

In one embodiment, the above phrase of "the first node may drop transmitting the second information" includes the following meaning: not excluding a possibility of the first node transmitting the second information.

In one embodiment, the above phrase of "the first node may drop transmitting the second information" includes the following meaning: the first node is allowed to drop transmitting the second information.

In one embodiment, the above phrase of "the first node may drop transmitting the second information" includes the following meaning: the first node is allowed to drop transmitting the second information, and whether the first node finally drops transmitting the second information is left to an implementation of the first node.

In one embodiment, the above phrase of "the first node may drop transmitting the second information" includes the following meaning: the first node is allowed to drop transmitting the second information, and whether the first node finally drops transmitting the second information is left to a capability of the first node.

In one embodiment, the above phrase of "the first node may drop transmitting the second information" includes the following meaning: the first node may not be able to provide valid the second information.

In one embodiment, the above phrase of "the first node may drop transmitting the second information" includes the following meaning: the first node may not be able to provide correct the second information.

In one embodiment, the above phrase of "the first node may drop transmitting the second information" includes the following meaning: a receiver of the second information cannot expect to receive valid the second information.

In one embodiment, when the first node drops transmitting the second information, the first node may use resources in the target time-frequency resource set to transmit information other than the second information.

In one embodiment, when the first node drops transmitting the second information, the first node may not use resources in the target time-frequency resource set to transmit any information.

In one embodiment, when the first node drops transmitting the second information, the first node may still use time-frequency resources in the target time-frequency resource set to transmit a PUCCH.

In one embodiment, when the first node drops transmitting the second information, the first node may still use time-frequency resources in the target time-frequency resource set to transmit a PUSCH.

In one embodiment, when the first node drops transmitting the second information, the first node may still use time-frequency resources in the target time-frequency resource set to transmit a radio signal.

In one embodiment, the above phrase of "the first node may ignore the first information" includes the following meaning: the first node may not follow an indication of the first information.

In one embodiment, the above phrase of "the first node may ignore the first information" includes the following meaning: the first node may assume that the first information is not correctly received.

In one embodiment, the above phrase of "the first node may ignore the first information" includes the following meaning: the first node may assume that the first information is not transmitted.

In one embodiment, the above phrase of "the first node may ignore the first information" includes the following meaning: the first node may assume the first node invalid.

In one embodiment, the above phrase of "the first node may ignore the first information" includes the following meaning: whether the first node finally ignores the first information is left to an implementation of the first node.

In one embodiment, the above phrase of "the first node may ignore the first information" includes the following meaning: whether the first node finally ignores the first information is left to a capability of the first node.

In one embodiment, the above phrase of "the first node may ignore the first information" includes the following meaning: a transmitter of the first information may not expect that the first node in the present disclosure follows an indication of the first information.

In one embodiment, the above phrase of "the first node may assume that the target time-frequency resource set is invalid" includes the following meaning: the first node may not use the target time-frequency resource set to transmit a signal.

In one embodiment, the above phrase of "the first node may assume that the target time-frequency resource set is invalid" includes the following meaning: the first node may assume that the target time-frequency resource set is not used to transmit the second information.

In one embodiment, the above phrase of "the first node may assume that the target time-frequency resource set is invalid" includes the following meaning: the first node may assume that the target time-frequency resource set can only be used to transmit information other than the second information.

In one embodiment, the above phrase of "the first node may assume that the target time-frequency resource set is invalid" includes the following meaning: the first node may assume that the target time-frequency resource set is not reserved for the second information.

In one embodiment, the above phrase of "the first node may assume that the target time-frequency resource set is invalid" includes the following meaning: whether the first node finally assumes the target time-frequency resource valid is left to an implementation of the first node.

In one embodiment, the above phrase of "the first node may assume that the target time-frequency resource set is invalid" includes the following meaning: whether the first node finally assumes the target time-frequency resource valid is left to a capability of the first node.

In one embodiment, the above phrase of "the first node may assume that the target time-frequency resource set is invalid" includes the following meaning: a transmitter of the first information does not expect that the first node uses resources in the target time-frequency resource set to transmit the second information.

Embodiment 9

Embodiment 9 illustrates a schematic diagram of a length of a switching time between a reception and a transmission of a first node according to one embodiment of the present disclosure, as shown in FIG. 9. In FIG. 9, the first column on the left represents types of lengths of switching time between a reception and a transmission of the first node, the second column on the left represents lengths of switching time in Frequency Range 1 (FR1), and the third column on the left represents lengths of switching time in FR2, and a value of lengths of all switching time is measured by Tc.

In embodiment 9, the reference delay in the present disclosure is not less than a first delay, and a length of a switching time between a reception and a transmission of the first node in the present disclosure is used to determine the first delay.

In one embodiment, the reference delay is equal to the first delay.

In one embodiment, the reference delay is greater than the first delay.

In one embodiment, the first delay is measured by s.

In one embodiment, the first delay is measured by ms.

In one embodiment, the first delay is equal to a time length of at least one OFDM symbol.

In one embodiment, the first delay is equal to a time length of at least one slot.

In one embodiment, the first delay is equal to a positive integral multiple of Tc, where Tc=1/(480000*4096) s.

In one embodiment, the first delay is represented by a number of OFDM symbol(s).

In one embodiment, the first delay is represented by a number of slot(s).

In one embodiment, the first delay is represented by a number of Tc(s), where Tc=1/(480000*4096) s.

In one embodiment, the first delay is equal to a time length of at least one OFDM symbol, and the OFDM symbol(s) corresponds(correspond) to an SCS of a subcarrier in the first frequency-domain resource pool.

In one embodiment, the first delay is equal to a time length of at least one OFDM symbol, and the OFDM symbol(s) corresponds(correspond) to an SCS of a subcarrier in the second frequency-domain resource pool.

In one embodiment, the first delay is equal to a time length of a positive integral number of OFDM symbol(s) other than an earliest OFDM symbol in a slot.

In one embodiment, the first delay is equal to a time length of at least one slot corresponding to an SCS of a subcarrier comprised in the first frequency-domain resource pool.

In one embodiment, the first delay is equal to a time length of at least one slot corresponding to an SCS of a subcarrier comprised in the second frequency-domain resource pool.

In one embodiment, the first delay is related to an FR to which frequency-domain resources comprised in the first frequency-domain resource pool belong.

In one embodiment, the first delay is related to an FR to which frequency-domain resources comprised in the second frequency-domain resource pool belong.

In one embodiment, the first delay is equal to 25600Tc, or the first delay is equal to 13792Tc, where Tc=1/(480000*4096) s.

In one embodiment, when an FR to which frequency-domain resources comprised in the first frequency-domain resource pool belong is FR1, the first delay is equal to 25600Tc; and when an FR to which frequency-domain resources comprised in the first frequency-domain resource pool belong is FR2, the first delay is equal to 13792Tc; where Tc=1/(480000*4096) s.

In one embodiment, the first delay is related to an SCS of a subcarrier comprised in the first frequency-domain resource pool.

In one embodiment, the first delay is related to an SCS of a subcarrier comprised in the second frequency-domain resource pool.

In one embodiment, the first delay is related to a waveform adopted by a signal carrying the second information.

In one embodiment, the first delay is related to whether a signal carrying the second information adopts an OFDM waveform or a DFT-s-OFDM waveform.

In one embodiment, the first delay is related to whether transform precoding is adopted when a signal carrying the second information is generated.

In one embodiment, the above phrase of "a length of a switching time between a reception and a transmission of the first node being used to determine the first delay" includes the following meaning: a length of a switching time between a reception and a transmission of the first node is used by the first node in the present disclosure to determine the first delay.

In one embodiment, the above phrase of "a length of a switching time between a reception and a transmission of the first node being used to determine the first delay" includes the following meaning: a length of a switching time between a reception and a transmission of the first node is equal to the first delay.

In one embodiment, the above phrase of "a length of a switching time between a reception and a transmission of the first node being used to determine the first delay" includes the following meaning: the first delay is not less than a length of a switching time between a reception and a transmission of the first node.

In one embodiment, the above phrase of "a length of a switching time between a reception and a transmission of the first node being used to determine the first delay" includes the following meaning: a length of a switching time between a reception and a transmission of the first node determines the first delay according to a mapping relation.

In one embodiment, the above phrase of "a length of a switching time between a reception and a transmission of the first node being used to determine the first delay" includes the following meaning: a length of a switching time between a reception and a transmission of the first node determines the first delay according to a functional relation.

In one embodiment, the above phrase of "a length of a switching time between a reception and a transmission of the first node being used to determine the first delay" includes the following meaning: a sum of a length of a switching time between a reception and a transmission of the first node and a length of a first offset time is equal to the first delay, a length of the first offset time is fixed, or a length of the first offset time is pre-defined.

In one embodiment, "a length of a switching time between a reception and a transmission of the first node" refers to a length of a switching time from a reception to a transmission of the first node In one embodiment, "a length of a switching time between a reception and a transmission of the first node" refers to a length of a switching time from a transmission to a reception of the first node In one embodiment, a length of a switching time from a reception to a transmission of the first node is equal to a length of a switching time from a transmission to a reception of the first node.

In one embodiment, a transmission of the first node in sidelink is half-duplex.

In one embodiment, a transmission of the first node between sidelink and uplink is half-duplex.

In one embodiment, the first node does not support full-duplex.

In one embodiment, a band to which the first frequency-domain resource pool belongs is a TDD frequency band.

In one embodiment, a band to which the first frequency-domain resource pool belongs is an FDD frequency band.

In one embodiment, a band to which the second frequency-domain resource pool belongs is a TDD frequency band.

In one embodiment, a band to which the second frequency-domain resource pool belongs is an FDD frequency band.

Embodiment 10

Embodiment 10 illustrates a schematic diagram of a second delay according to one embodiment of the present disclosure, as shown in FIG. 10. In FIG. 10, when a first frequency-domain resource pool is different from a second frequency-domain resource pool, the first column on the left represents SCSs of subcarriers comprised in a first time-frequency resource pool in frequency domain, the second column on the left represents SCSs of subcarriers comprised in the second time-frequency resource pool in frequency domain, the third column on the left represents time lengths of slots of different SCSs, and the fourth column on the left represents second delays measured by slot.

In embodiment 10, the reference delay in the present disclosure is not less than a second delay; when the first frequency-domain resource pool in the present disclosure is the same as the second frequency-domain resource pool in the present disclosure, the second delay is equal to 0; when the first frequency-domain resource pool in the present disclosure is different from the second frequency-domain resource pool in the present disclosure, the second delay is greater than 0, and one of an SCS of a subcarrier comprised in the first time-frequency resource pool in the present disclosure in frequency domain and an SCS of a subcarrier comprised in the second time-frequency resource pool in the present disclosure in frequency domain is used to determine the second delay.

In one embodiment, the reference delay is equal to the second delay.

In one embodiment, the reference delay is greater than the second delay.

In one embodiment, the second delay is measured by s.

In one embodiment, the second delay is measured by ms.

In one embodiment, the second delay is equal to a time length of at least one OFDM symbol.

In one embodiment, the second delay is equal to a time length of at least one slot.

In one embodiment, the second delay is equal to a positive integral multiple of Tc, where $Tc=1/(480000*4096)$ s.

In one embodiment, the second delay is represented by a number of OFDM symbol(s).

In one embodiment, the second delay is represented by a number of slot(s).

In one embodiment, the second delay is represented by a number of Tc(s), where $Tc=1/(480000*4096)$ s.

In one embodiment, the second delay is equal to a time length of at least one OFDM symbol, and the OFDM symbol(s) corresponds(correspond) to an SCS of a subcarrier in the first frequency-domain resource pool.

In one embodiment, the second delay is equal to a time length of at least one OFDM symbol, and the OFDM symbol(s) corresponds(correspond) to an SCS of a subcarrier in the second frequency-domain resource pool.

In one embodiment, the second delay is equal to a time length of a positive integral number of OFDM symbol(s) other than an earliest OFDM symbol in a slot.

In one embodiment, the second delay is equal to a time length of at least one slot corresponding to an SCS of a subcarrier comprised in the first frequency-domain resource pool.

In one embodiment, the second delay is equal to a time length of at least one slot corresponding to an SCS of a subcarrier comprised in the second frequency-domain resource pool.

In one embodiment, the reference delay is not less than the second delay, and a frequency-domain relation between the first frequency-domain resource pool and the second frequency-domain resource pool is used to determine the second delay.

In one embodiment, the second delay is equal to an interruption length.

In one embodiment, whether the first frequency-domain resource pool and the second frequency-domain resource pool are the same is judged according to whether an SLIV of the first frequency-domain resource pool is the same as an SLIV of the second frequency-domain resource pool.

In one embodiment, whether the first frequency-domain resource pool is the same as the second frequency-domain resource pool is judged according to whether a locationAndBandwidth parameter of the first frequency-domain resource pool is the same as a locationAndBandwidth parameter of the second frequency-domain resource pool.

In one embodiment, whether the first frequency-domain resource pool is the same as the second frequency-domain resource pool is judged according to whether an SCS of a subcarrier comprised in the first frequency-domain resource pool is the same as an SCS of a subcarrier comprised in the second frequency-domain resource pool.

In one embodiment, whether the first frequency-domain resource pool is the same as the second frequency-domain resource pool is judged according to whether an SLIV of the first frequency-domain resource pool is the same as an SLIV of the second frequency-domain resource pool and whether an SCS of a subcarrier comprised in the first frequency-domain resource pool is the same as an SCS of a subcarrier comprised in the second frequency-domain resource pool.

In one embodiment, when an SCS of a subcarrier comprised in the first frequency-domain resource pool is the same as an SCS of a subcarrier comprised in the second frequency-domain resource pool, and when a frequency-domain starting location and a bandwidth of the first frequency-domain resource pool are respectively the same as a frequency-domain starting location and a bandwidth of the second frequency-domain resource pool, the first frequency-domain resource pool is the same as the second frequency-domain resource pool; otherwise, the first frequency-domain resource pool is different from the second frequency-domain resource pool.

In one embodiment, "the first frequency-domain resource pool being the same as the second frequency-domain resource pool" refers to: frequency-domain resources comprised in the first frequency-domain resource pool are the same as frequency-domain resources comprised in the second frequency-domain resource pool and an SCS of a subcarrier comprised in the first frequency-domain resource pool is equal to an SCS of a subcarrier comprised in the second frequency-domain resource pool.

In one embodiment, the above phrase of "one of an SCS of a subcarrier comprised in the first time-frequency resource pool in frequency domain or an SCS of a subcarrier comprised in the second time-frequency resource pool in frequency domain being used to determine the second delay" includes the following meaning: M SCSs respectively correspond to M candidate delays, and any two of the M SCSs are not equal, M being a positive integer greater than 1; an SCS of a subcarrier comprised in the first time-frequency resource pool in frequency domain corresponds to a first candidate delay, and an SCS of a subcarrier comprised in the second time-frequency resource pool in frequency domain corresponds to a second candidate delay, the first candidate delay is one of the M candidate delays, the second candidate delay is one of the M candidate delays, an SCS of a subcarrier comprised in the first time-frequency resource pool in frequency domain is one of the M SCSs, and an SCS of a subcarrier comprised in the second time-frequency resource pool in frequency domain is one of the M SCSs; the second delay is equal to a greater one between the first candidate delay and the second candidate delay.

In one embodiment, the above phrase of "one of an SCS of a subcarrier comprised in the first time-frequency resource pool in frequency domain or an SCS of a subcarrier comprised in the second time-frequency resource pool in frequency domain being used to determine the second delay" includes the following meaning: M SCSs respectively correspond to M candidate delays, and any two of the M SCSs are not equal, M being a positive integer greater than 1; when an SCS of a subcarrier comprised in the first time-frequency resource pool in frequency domain is not equal to an SCS of a subcarrier comprised in the second time-frequency resource pool in frequency domain, a target SCS is equal to a greater one between an SCS of a subcarrier comprised in the first time-frequency resource pool in frequency domain and an SCS of a subcarrier comprised in the second time-frequency resource pool in frequency domain; when an SCS of a subcarrier comprised in the first time-frequency resource pool in frequency domain is equal to an SCS of a subcarrier comprised in the second time-frequency resource pool in frequency domain, a target SCS is equal to an SCS of a subcarrier comprised in the first time-frequency resource pool in frequency domain; the target SCS is equal to one of the M SCSs, and the second delay is equal to one of the M candidate delays corresponding to the target SCS.

In one embodiment, the above phrase of "one of an SCS of a subcarrier comprised in the first time-frequency resource pool in frequency domain or an SCS of a subcarrier comprised in the second time-frequency resource pool in frequency domain being used to determine the second delay" includes the following meaning: one of an SCS of a subcarrier comprised in the first time-frequency resource pool in frequency domain or an SCS of a subcarrier comprised in the second time-frequency resource pool in frequency domain is used by the first node in the present disclosure to determine the second delay.

In one embodiment, the above phrase of "one of an SCS of a subcarrier comprised in the first time-frequency resource pool in frequency domain or an SCS of a subcarrier comprised in the second time-frequency resource pool in frequency domain being used to determine the second delay" includes the following meaning: a greater one between an SCS of a subcarrier comprised in the first time-frequency resource pool in frequency domain and an SCS of a subcarrier comprised in the second time-frequency resource pool in frequency domain is used to determine the second delay.

In one embodiment, when the second delay is greater than 0, the second delay is equal to one of a time length of one slot corresponding to 15 kHz SCS, a time length of one slot corresponding to 30 kHz SCS, a time length of three slots corresponding to 60 kHz SCS, and a time length of five slots corresponding to 120 kHz SCS.

In one embodiment, the second delay is related to a waveform adopted by a signal carrying the second information.

In one embodiment, the second delay is related to whether a signal carrying the second information adopts an OFDM waveform or a DFT-s-OFDM waveform.

In one embodiment, the second delay is related to whether transform precoding is adopted when a signal carrying the second information is generated.

Embodiment 11

Embodiment 11 illustrates a schematic diagram of a first characteristic delay and a second characteristic delay according to one embodiment of the present disclosure, as shown in FIG. 11. In FIG. 11, the first column on the left represents first SCSs, the second column on the left represents first characteristic delays respectively corresponding to different first SCSs, the third column on the left represents second SCSs, and the fourth column on the left represents second characteristic delays respectively corresponding different second SCSs.

In embodiment 11, the reference delay in the present disclosure is not less than a third delay, an SCS of a subcarrier comprised in the first time-frequency resource pool in the present disclosure in frequency domain is equal to a first SCS, and an SCS of a subcarrier comprised in the second time-frequency resource pool in the present disclosure in frequency domain is equal to a second SCS, the first SCS is used to determine a first characteristic delay, the second SCS is used to determine a second characteristic delay, and one of the first characteristic delay or the second characteristic delay is used to determine the third delay.

In one embodiment, the reference delay is equal to the third delay.

In one embodiment, the reference delay is greater than the third delay.

In one embodiment, the third delay is related to a processing capability of the first node.

In one embodiment, the third delay is linearly related to a processing delay of the first node.

In one embodiment, the third delay is measured by s.

In one embodiment, the third delay is measured by ms.

In one embodiment, the third delay is equal to a time length of at least one OFDM symbol.

In one embodiment, the third delay is equal to a time length of at least one slot.

In one embodiment, the third delay is equal to a positive integral multiple of Tc, where Tc=1/(480000*4096) s.

In one embodiment, the third delay is represented by a number of OFDM symbol(s).

In one embodiment, the third delay is represented by a number of slot(s).

In one embodiment, the third delay is represented through a number of Tc(s), where Tc=1/(480000*4096) s.

In one embodiment, the third delay is equal to a time length of at least one OFDM symbol, and the OFDM symbol(s) corresponds(correspond) to an SCS of a subcarrier in the first frequency-domain resource pool.

In one embodiment, the third delay is equal to a time length of at least one OFDM symbol, and the OFDM symbol(s) corresponds(correspond) to an SCS of a subcarrier in the second frequency-domain resource pool.

In one embodiment, the third delay is equal to a time length of a positive integral number of OFDM symbol(s) other than an earliest OFDM symbol in a slot.

In one embodiment, the third delay is equal to a time length of at least one slot corresponding to an SCS of a subcarrier comprised in the first frequency-domain resource pool.

In one embodiment, the third delay is equal to a time length of at least one slot corresponding to an SCS of a subcarrier comprised in the second frequency-domain resource pool.

In one embodiment, the third delay is related to a waveform adopted by a signal carrying the second information.

In one embodiment, the third delay is related to whether a signal carrying the second information adopts an OFDM waveform or a DFT-s-OFDM waveform.

In one embodiment, the third delay is related to whether transform precoding is adopted when a signal carrying the second information is generated.

In one embodiment, the first SCS is equal to one of 15 kHz, 30 kHz, 60 kHz, 120 kHz or 240 kHz.

In one embodiment, the second SCS is equal to one of 15 kHz, 30 kHz, 60 kHz, 120 kHz or 240 kHz.

In one embodiment, the above phrase of "the first SCS being used to determine a first characteristic delay" includes the following meaning: the first SCS is used by the first node in the present disclosure to determine the first characteristic delay.

In one embodiment, the above phrase of "the second SCS being used to determine a second characteristic delay" includes the following meaning: the second SCS is used by the first node in the present disclosure to determine the second characteristic delay.

In one embodiment, the above phrase of "the first SCS being used to determine a first characteristic delay" includes the following meaning: the first SCS is used by the second node in the present disclosure to determine the first characteristic delay.

In one embodiment, the above phrase of "the second SCS being used to determine a second characteristic delay" includes the following meaning: the second SCS is used by the second node in the present disclosure to determine the second characteristic delay.

In one embodiment, the above phrase of "the first SCS being used to determine a first characteristic delay" includes the following meaning: P SCSs respectively correspond to P characteristic delays, P is a positive integer greater than 1, the first SCS is equal to one of the P SCSs, the first characteristic delay is equal to one of the P characteristic delays corresponding to the first SCS, and the P characteristic delays are pre-defined.

In one embodiment, the above phrase of "the first SCS being used to determine a first characteristic delay" includes the following meaning: P SCSs respectively correspond to P characteristic delays, P is a positive integer greater than 1, the first SCS is equal to one of the P SCSs, the first characteristic delay is equal to one of the P characteristic delays corresponding to the first SCS, and the P characteristic delays are configurable.

In one embodiment, the above phrase of "the second SCS being used to determine a second characteristic delay" includes the following meaning: P SCSs respectively correspond to P characteristic delays, P is a positive integer greater than 1, the second SCS is equal to one of the P SCSs, the second characteristic delay is equal to one of the P characteristic delays corresponding to the second SCS, and the P characteristic delays are pre-defined.

In one embodiment, the above phrase of "the second SCS being used to determine a second characteristic delay" includes the following meaning: P SCSs respectively correspond to P characteristic delays, P is a positive integer greater than 1, the second SCS is equal to one of the P SCSs, the second characteristic delay is equal to one of the P characteristic delays corresponding to the second SCS, and the P characteristic delays are configurable.

In one embodiment, the above phrase of "one of the first characteristic delay or the second characteristic delay being used to determine the third delay" includes the following meaning: one of the first characteristic delay or the second characteristic delay is used by the first node in the present disclosure to determine the third delay.

In one embodiment, the above phrase of "one of the first characteristic delay or the second characteristic delay being used to determine the third delay" includes the following meaning: a greater one between the first characteristic delay and the second characteristic delay is used to determine the third delay.

In one embodiment, the above phrase of "one of the first characteristic delay or the second characteristic delay being used to determine the third delay" includes the following meaning: the third delay is equal to a greater one between the first characteristic delay and the second characteristic delay.

In one embodiment, the above phrase of "one of the first characteristic delay or the second characteristic delay being used to determine the third delay" includes the following meaning: the third delay is linearly associated with one of the first characteristic delay or the second characteristic delay.

In one embodiment, the above phrase of "one of the first characteristic delay or the second characteristic delay being used to determine the third delay" includes the following meaning: a characteristic delay that can obtain a maximum the reference delay between the first characteristic delay and the second characteristic delay is used to determine the third delay.

In one embodiment, the above phrase of "one of the first characteristic delay or the second characteristic delay being used to determine the third delay" includes the following meaning: the third delay is linearly associated with a characteristic delay that can obtain a maximum the reference delay between the first characteristic delay and the second characteristic delay.

In one embodiment, the third delay and the second delay in the present disclosure are calculated separately.

In one embodiment, the reference delay is equal to a greater one among the first delay in the present disclosure, the second delay in the present disclosure and the third delay in the present disclosure.

In one embodiment, the reference delay is equal to a greater one between the first delay in the present disclosure and the third delay in the present disclosure.

In one embodiment, the reference delay is equal to a greater one between the first delay in the present disclosure and the second delay in the present disclosure.

In one embodiment, the reference delay is equal to a greater one between the second delay in the present disclosure and the third delay in the present disclosure.

In one embodiment, the reference delay is calculated by the following formula:

$$T_{PSFCH-PUCCH} = \max(t_{4,1}, t_{4,2}, t_{4,3})$$

herein, $T_{PSFCH-PUCCH}$ represents the reference delay, $t_{4,1}$ represents the first delay in the present disclosure, $t_{4,2}$ represents the second delay in the present disclosure, and $t_{4,3}$ represents the third delay in the present disclosure.

In one embodiment, the reference delay is calculated by the following formula:

$$T_{PSFCH-PUCCH} = \max(t_{4,1}, t_{4,2}, t_{4,3}),$$

herein, $T_{PSFCH-PUCCH}$ represents the reference delay, $t_{4,1}$ represents the first delay in the present disclosure, $t_{4,2}$ represents the second delay in the present disclosure, $t_{4,3}$ represents the third delay in the present disclosure, and the above phrase of "one of the first characteristic delay or the second characteristic delay being used to determine the third delay" is implemented through the following formula:

$$t_{4,3} = (N_{4,\mu} + d_{4,1})(2048 + 144) \cdot \kappa 2^{-\mu} \cdot T_c,$$

$$\mu = \arg\max_{\mu \in \{\mu_1, \mu_2\}} (T_{PSFCH-PUCCH})$$

herein, $N_{4,\mu_1}$ represents the first characteristic delay, $N_{4,\mu_2}$ represents the second characteristic delay, $d_{4,1}$ is a configurable value, $\kappa=64$, $\mu$ represents an index of an SCS, $T_c=1/(480000*4096)$ s, $\mu_1$ represents an index of the first SCS, and $\mu_2$ represents an index of the second SCS.

In one embodiment, the reference delay is calculated by the following formula:

$$T_{PSFCH-PUCCH} = \max(t_{4,2}, t_{4,3}),$$

herein, $T_{PSFCH-PUCCH}$ represents the reference delay, $t_{4,2}$ represents the second delay in the present disclosure, $t_{4,3}$ represents the third delay in the present disclosure, and the above phrase of "one of the first characteristic delay or the second characteristic delay being used to determine the third delay" is implemented through the following formula:

$$t_{4,3} = (N_{4,\mu} + d_{4,1})(2048 + 144) \cdot \kappa 2^{-\mu} \cdot T_c,$$

$$\mu = \arg\max_{\mu \in \{\mu_1, \mu_2\}} (T_{PSFCH-PUCCH})$$

herein, $N_{4,\mu_1}$ represents the first characteristic delay, $N_{4,\mu_2}$ represents the second characteristic delay, $d_{4,1}$ is a configurable value, $\kappa=64$, $\mu$ represents an index of an SCS, $T_c=1/(480000*4096)$ s, $\mu_1$ represents an index of the first SCS, and $\mu_2$ represents an index of the second SCS.

In one embodiment, the reference delay is calculated by the following formula:

$$T_{PSFCH-PUCCH} = \max(t_{4,1}, t_{4,2}, t_{4,3}),$$

herein, $T_{PSFCH-PUCCH}$ represents the reference delay, $t_{4,1}$ represents the first delay in the present disclosure, $t_{4,2}$ represents the second delay in the present disclosure, $t_{4,3}$ represents the third delay in the present disclosure, and the above phrase of "one of the first characteristic delay or the second characteristic delay being used to determine the third delay" is implemented through the following formula:

$$t_{4,3} = (N_{4,\mu} + d_{4,1})(2048 + 144) \cdot \kappa 2^{-\mu} \cdot T_c,$$

$$\mu = \arg\max_{\mu \in \{\mu_1, \mu_2\}} (T_{PSFCH-PUCCH})$$

herein, $N_{4,\mu_1}(2048+144) \cdot \kappa 2^{-\mu} \cdot T_c$ represents the first characteristic delay, $N_{4,\mu_2}(2048+144) \cdot \kappa 2^{-\mu} \cdot T_c$ represents the second characteristic delay, $d_{4,1}$ is a configurable value, $\kappa=64$, $\mu$ represents an index of an SCS, $T_c=1/(480000*4096)$ s, $\mu_1$ represents an index of the first SCS, and $\mu_2$ represents an index of the second SCS.

Embodiment 12

Embodiment 12 illustrates a schematic diagram of an information format adopted by physical layer information carried by a second signal according to one embodiment of the present disclosure, as shown in FIG. 12. In FIG. 12, the first column on the left represents an index of an information format adopted by physical layer information carried by a second signal, the second column on the left represents a number of multicarrier symbol(s) occupied a second signal, the third column on the left represents a number of bit(s) of physical layer information carried by a second signal, and the fourth column on the left represents a channel coding scheme adopted by a second signal.

In embodiment, the second signal in the present disclosure carries physical layer information, physical layer information carried by the second signal in the present disclosure is used to determine whether the first signal in the present disclosure is correctly received, and an information format adopted by physical layer information carried by the second signal in the present disclosure is used to determine the third delay in the present disclosure.

In one embodiment, physical layer information carried by the second signal comprises HARQ-ACK information.

In one embodiment, physical layer information carried by the second signal comprises SFI.

In one embodiment, physical layer information carried by the second signal comprises CSI information.

In one embodiment, physical layer information carried by the second signal comprises L1-RSRP information.

In one embodiment, the above phrase of "the second signal being used to determine whether the first signal is correctly received" includes the following meaning: physical layer information carried by the second signal is used by a first node in the present disclosure to determine whether the first signal is correctly received.

In one embodiment, the above phrase of "the second signal being used to determine whether the first signal is correctly received" includes the following meaning: physical layer information carried by the second signal is used to determine that the first signal is not correctly received.

In one embodiment, the above phrase of "the second signal being used to determine whether the first signal is correctly received" includes the following meaning: physical layer information carried by the second signal is used to determine whether the first signal is correctly decoded.

In one embodiment, the above phrase of "the second signal being used to determine whether the first signal is correctly received" includes the following meaning: physical layer information carried by the second signal is used to determine whether a CRC check is passed when the first signal is decoding.

In one embodiment, "an information format adopted by physical layer information carried by the second signal" includes a number of bit(s) comprised in physical layer information carried by the second signal.

In one embodiment, "an information format adopted by physical layer information carried by the second signal" includes a type of channel coding adopted by physical layer information carried by the second signal when generating the second signal.

In one embodiment, "an information format adopted by physical layer information carried by the second signal" includes whether physical layer information carried by the second signal adopts a sequence to generate the second signal.

In one embodiment, "an information format adopted by physical layer information carried by the second signal" includes a format of an SFI carried by the second signal.

In one embodiment, an information format and a PUCCH format adopted by physical layer information carried by the second signal adopts a same division method.

In one embodiment, the above phrase of "an information format adopted by physical layer information carried by the second signal being used to determine the third delay" includes the following meaning: an information format adopted by physical layer information carried by the second signal is used by the first node in the present disclosure to determine the third delay.

In one embodiment, the above phrase of "an information format adopted by physical layer information carried by the second signal being used to determine the third delay" includes the following meaning: an information format adopted by physical layer information carried by the second signal is used to determine the third delay according to a corresponding relation.

In one embodiment, the above phrase of "an information format adopted by physical layer information carried by the second signal being used to determine the third delay" includes the following meaning: an information format adopted by physical layer information carried by the second signal is used to determine a target delay offset according to a corresponding relation, and the target delay is used to determine the third delay.

In one embodiment, the above phrase of "an information format adopted by physical layer information carried by the second signal being used to determine the third delay" is implemented through the following formula:

$$t_{4,3} = (N_{4,\mu} + d_{4,1})(2048 + 144) \cdot K2^{-\mu} \cdot T_c,$$

$$\mu = \arg\max_{\mu \in \{\mu_1, \mu_2\}} (T_{PSFCH-PUCCH})$$

herein, $t_{4,3}$ represents the third delay, $N_{4,\mu_1}$ represents the first characteristic delay in the present disclosure, $N_{4,\mu_2}$, represents the second characteristic delay in the present disclosure, $d_\mu$ represents a target delay offset, and an information adopted by physical layer information carried by the second signal is used to determine a target delay offset according to a corresponding relation, $\kappa=64$, $\mu$ represents an index of an SCS, $T_c=1/(480000*4096)$ s, $\mu_1$ represents an index of the first SCS in the present disclosure, and $\mu_2$ represents an index of the second SCS in the present disclosure.

In one embodiment, an information format adopted by physical layer information carried by the second signal is used to determine a target delay offset according to a corresponding relation, the target delay is used to determine the third delay, and the target delay offset is also related to a waveform adopted by a signal (or channel) carrying the second information.

In one embodiment, an information format adopted by physical layer information carried by the second signal is used to determine a target delay offset according to a corresponding relation, the target delay is used to determine the third delay, and the target delay offset is also related to an OFDM waveform or a DFT-s-ofdm waveform adopted by a signal (or channel) carrying the second information.

Embodiment 13

Embodiment 13 illustrates a structure diagram of a processing device in a first node of an embodiment, as shown in FIG. 13. In FIG. 13, a processing device 1300 of a first node comprises a first receiver 1301, a first transmitter 1302, a second receiver 1303 and a second transmitter 1304. The first receiver 1301 comprises the transmitter/receiver 456 (including the antenna 460), the receiving processor 452 and the controller/processor 490 in FIG. 4 of the present disclosure; or the first receiver 1301 comprises the transmitter/receiver 556 (including the antenna 560), the receiving processor 552 and the controller/processor 590 in FIG. 5 of the present disclosure; the first transmitter 1302 comprises the transmitter/receiver 456 (including the antenna 460), the transmitting processor 455 and the controller/processor 490 in FIG. 4 of the present disclosure; or the first transmitter 1302 comprises the transmitter/receiver 556 (including the antenna 560), the transmitting processor 555 and the controller/processor 590 in FIG. 5 of the present disclosure; the second receiver 1303 comprises the transmitter/receiver 456 (including the antenna 460) and the receiving processor 452 in FIG. 4 in the present disclosure; or the second receiver 1303 comprises the transmitter/receiver 556 (including the antenna 560) and the receiving processor 552 in FIG. 5 in the present disclosure; the second transmitter 1304 comprises the transmitter/receiver 456 (including the antenna 460), the transmitting processor 455 and the controller/processor 490 in FIG. 4 of the present disclosure; or the second transmitter 1304 comprises the transmitter/receiver 556 (including the antenna 560), the transmitting processor 555 and the controller/processor 590 in FIG. 5 of the present disclosure;

In embodiment 13, the first receiver 1301 receives first information, the first information is used to determine a target time-frequency resource set, an earliest multicarrier symbol comprised in the target time-frequency resource set in time domain is a first multicarrier symbol, frequency-domain resources comprised in the target time-frequency resource set belong to a first frequency-domain resource pool; the first transmitter 1302 transmits a first signal, frequency-domain resources occupied by the first signal belong to a second frequency-domain resource pool, a frequency-domain relation between the first frequency-domain resource pool and the second frequency-domain resource pool is used to determine a reference delay; the second receiver 1303 receives a second signal, a length of a time interval between a start time of a second multicarrier symbol and an end time for receiving the second signal is equal to the reference delay, the start time of the second multicarrier symbol is not earlier than the end time for receiving the second signal; the second transmitter 1304, when the first multicarrier symbol is not earlier than the second multicarrier symbol, transmits second information; when the second information is transmitted, the target time-frequency resource set is used for a transmission of the second information; time-frequency resources occupied by the first signal are used to determine radio resources occupied by the second signal; information carried by the second signal is used to determine the second information, and a transmitter of the first information is different from a transmitter of the second signal.

In one embodiment, when the first multicarrier symbol is earlier than the second multicarrier symbol, the first node may drop transmitting the second information, or the first node may ignore the first information, or the first node device may assume the target time-frequency resource set invalid.

In one embodiment, the reference delay is not less than a first delay, and a length of a switching time between a reception and a transmission of the first node is used to determine the first delay.

In one embodiment, the reference delay is not less than a second delay; when the first frequency-domain resource pool is the same as the second frequency-domain resource pool, the second delay is equal to 0; when the first frequency-domain resource pool is different from the second frequency-domain resource pool, the second delay is greater than 0, and one of an SCS of a subcarrier comprised in the first time-frequency resource pool in frequency domain or an SCS of a subcarrier comprised in the second time-frequency resource pool in frequency domain is used to determine the second delay.

In one embodiment, the reference delay is not less than a third delay, an SCS of a subcarrier comprised in the first time-frequency resource pool in frequency domain is equal to a first SCS, and an SCS of a subcarrier comprised in the second time-frequency resource pool in frequency domain is equal to a second SCS, the first SCS is used to determine a first characteristic delay, the second SCS is used to determine a second characteristic delay, and one of the first characteristic delay or the second characteristic delay is used to determine the third delay.

In one embodiment, the reference delay is not less than a third delay, an SCS of a subcarrier comprised in the first time-frequency resource pool in frequency domain is equal to a first SCS, and an SCS of a subcarrier comprised in the second time-frequency resource pool in frequency domain is equal to a second SCS, the first SCS is used to determine a first characteristic delay, the second SCS is used to determine a second characteristic delay, and one of the first characteristic delay or the second characteristic delay is used to determine the third delay; the second signal carries physical layer information, the physical layer information carried by the second signal is used to determine whether the first signal is correctly received, and an information format adopted by the physical layer information carried by the second signal is used to determine the third delay.

In one embodiment, the first receiver 1301 receives a first signaling; herein, the first signaling is used to determine time-frequency resources occupied by the first signal, the first signaling is used to determine a length of a time interval between a start time of the first multicarrier symbol and an end time for receiving the first signaling.

In one embodiment, the first receiver 1301 receives the third information and the fourth information; herein, the third information is used to determine the first frequency-domain resource pool and an SCS of a subcarrier comprised in the first frequency-domain resource pool, and the fourth information is used to determine the second frequency-domain resource pool and an SCS of a subcarrier comprised in the second frequency-domain resource pool.

Embodiment 14

Embodiment 14 illustrates a structure block diagram of a processing device in a second node according to one embodiment of the present disclosure, as shown in FIG. 14. In FIG. 14, a processing device in a second node 1400 comprises a third transmitter 1401 and a third receiver 1402. The third transmitter 1401 comprises the transmitter/receiver 416 (including the antenna 460), the transmitting processor 415 and the controller/processor 440 in FIG. 4 of the present disclosure; and the third receiver 1402 comprises the transmitter/receiver 416 (including the antenna 420), the receiving processor 412 and the controller/processor 440 in FIG. 4 of the present disclosure.

In embodiment 14, the third transmitter 1401 transmits first information and a first signaling, the first information is used to indicate a target time-frequency resource set, an earliest multicarrier symbol comprised in the target time-frequency resource set in time domain is a first multicarrier symbol, frequency-domain resources comprised in the target time-frequency resource set belong to a first frequency-domain resource pool; the third receiver 1402 receives second information; herein, the first signaling is used to indicate time-frequency resources occupied by a first signal, frequency-domain resources occupied by the first signal belong to a second frequency-domain resource pool, a frequency-domain relation between the first frequency-domain resource pool and the second frequency-domain resource pool is used to determine a reference delay; time-frequency resources occupied by the first signal are used to indicate radio resources occupied by a second signal; a length of a time interval between a start time of a second multicarrier symbol and an end time for receiving the second signal is equal to the reference delay, the start time of the second multicarrier symbol is not earlier than the end time for receiving the second signal; the target time-frequency resource set is used for a transmission of the second information; information carried by the second signal is used to determine the second information, and a transmitter of the second signal is a node other than the second node; the first multicarrier symbol is not earlier than the second multicarrier symbol.

In one embodiment, the reference delay is not less than a first delay, and a length of a switching time between a reception and a transmission of a transmitter of the second information is used to determine the first delay.

In one embodiment, the reference delay is not less than a second delay; when the first frequency-domain resource pool is the same as the second frequency-domain resource pool, the second delay is equal to 0; when the first frequency-domain resource pool is different from the second frequency-domain resource pool, the second delay is greater than 0, and one of an SCS of a subcarrier comprised in the first time-frequency resource pool in frequency domain or an SCS of a subcarrier comprised in the second time-frequency resource pool in frequency domain is used to determine the second delay.

In one embodiment, the reference delay is not less than a third delay, an SCS of a subcarrier comprised in the first time-frequency resource pool in frequency domain is equal to a first SCS, and an SCS of a subcarrier comprised in the second time-frequency resource pool in frequency domain is equal to a second SCS, the first SCS is used to determine a first characteristic delay, the second SCS is used to determine a second characteristic delay, and one of the first characteristic delay or the second characteristic delay is used to determine the third delay.

In one embodiment, the reference delay is not less than a third delay, an SCS of a subcarrier comprised in the first time-frequency resource pool in frequency domain is equal to a first SCS, and an SCS of a subcarrier comprised in the second time-frequency resource pool in frequency domain is equal to a second SCS, the first SCS is used to determine a first characteristic delay, the second SCS is used to determine a second characteristic delay, and one of the first characteristic delay or the second characteristic delay is used to determine the third delay; the second signal carries physical layer information, the physical layer information carried by the second signal is used to determine whether the first signal is correctly received, and an information format adopted by the physical layer information carried by the second signal is used to determine the third delay.

In one embodiment, the first signaling is used to indicate a length of a time interval between a start time of the first multicarrier symbol and an end time for receiving the first signaling.

In one embodiment, the third transmitter 1401 transmits third information and fourth information; herein, the third information is used to indicate the first frequency-domain resource pool and an SCS of a subcarrier comprised in the first frequency-domain resource pool, and the fourth information is used to indicate the second frequency-domain resource pool and an SCS of a subcarrier comprised in the second frequency-domain resource pool.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The base station or network side equipment in the present disclosure includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving first information, the first information being used to determine a target time-frequency resource set, an earliest multicarrier symbol comprised in the target time-frequency resource set in time domain being a first multicarrier symbol, frequency-domain resources comprised in the target time-frequency resource set belonging to a first frequency-domain resource pool;
a first transmitter, transmitting a first signal, frequency-domain resources occupied by the first signal belonging to a second frequency-domain resource pool, a frequency-domain relation between the first frequency-domain resource pool and the second frequency-domain resource pool being used to determine a reference delay;
a second receiver, receiving a second signal, a length of a time interval between a start time of a second multicarrier symbol and an end time for receiving the second signal being equal to the reference delay, the start time of the second multicarrier symbol being not earlier than the end time for receiving the second signal; and
a second transmitter, when the first multicarrier symbol is not earlier than the second multicarrier symbol, transmitting second information;
wherein when the second information is transmitted, the target time-frequency resource set is used for a transmission of the second information; time-frequency resources occupied by the first signal are used to determine radio resources occupied by the second signal; information carried by the second signal is used to determine the second information, and a transmitter of the first information is different from a transmitter of the second signal.

2. The first node according to claim 1, wherein the reference delay is not less than a first delay, and a length of a switching time between a reception and a transmission of the first node is used to determine the first delay.

3. The first node according to claim 1, wherein the reference delay is not less than a second delay; when the first frequency-domain resource pool is the same as the second frequency-domain resource pool, the second delay is equal to 0; when the first frequency-domain resource pool is different from the second frequency-domain resource pool, the second delay is greater than 0, and one of a Subcarrier Spacing (SCS) of a subcarrier comprised in the first time-frequency resource pool in frequency domain or an SCS of a subcarrier comprised in the second time-frequency resource pool in frequency domain is used to determine the second delay.

4. The first node according to claim 1, wherein the reference delay is equal to a third delay, an SCS of a subcarrier comprised in the first time-frequency resource pool in frequency domain is equal to a first SCS, and an SCS of a subcarrier comprised in the second time-frequency resource pool in frequency domain is equal to a second SCS, the first SCS is used to determine a first characteristic delay, the second SCS is used to determine a second characteristic delay, and one of the first characteristic delay or the second characteristic delay is used to determine the third delay.

5. The first node according to claim 1, wherein the first receiver receives a first signaling; wherein the first signaling is used to determine time-frequency resources occupied by the first signal, the first signaling is used to determine a length of a time interval between a start time of the first multicarrier symbol and an end time for receiving the first signaling.

6. The first node according to claim 1, wherein the first receiver receives third information and fourth information; wherein the third information is used to determine the first frequency-domain resource pool and an SCS of a subcarrier comprised in the first frequency-domain resource pool, and the fourth information is used to determine the second frequency-domain resource pool and an SCS of a subcarrier comprised in the second frequency-domain resource pool.

7. The first node according to claim 1, wherein the reference delay is equal to a time length of a positive integral number of Orthogonal Frequency Division Multiplexing (OFDM) symbol(s) other than an earliest OFDM symbol in a slot, the OFDM symbol(s) corresponds(correspond) to an SCS of a subcarrier in the first frequency-domain resource pool, or the OFDM symbol(s) corresponds(correspond) to an SCS of a subcarrier in the second frequency-domain resource pool.

8. A second node for wireless communications, comprising:
a third transmitter, transmitting first information and a first signaling, the first information being used to indicate a target time-frequency resource set, an earliest multicarrier symbol comprised in the target time-frequency resource set in time domain being a first multicarrier symbol, frequency-domain resources comprised in the target time-frequency resource set belonging to a first frequency-domain resource pool; and
a third receiver, receiving second information;
wherein the first signaling is used to indicate time-frequency resources occupied by a first signal, frequency-domain resources occupied by the first signal belong to a second frequency-domain resource pool, a frequency-domain relation between the first frequency-domain resource pool and the second frequency-domain resource pool is used to determine a reference delay; time-frequency resources occupied by the first signal are used to indicate radio resources occupied by a second signal; a length of a time interval between a start time of a second multicarrier symbol and an end time for receiving the second signal is equal to the reference delay, the start time of the second multicarrier symbol is not earlier than the end time for receiving the second signal; the target time-frequency resource set is used for a transmission of the second information; information carried by the second signal is used to determine the second information, and a transmitter of the second signal is a node other than the second node; the first multicarrier symbol is not earlier than the second multicarrier symbol.

9. The second node according to claim 8, wherein the reference delay is not less than a first delay, and a length of a switching time between a reception and a transmission of a transmitter of the second information is used to determine the first delay.

10. The second node according to claim 8, wherein the reference delay is not less than a second delay; when the first frequency-domain resource pool is the same as the second frequency-domain resource pool, the second delay is equal to 0; when the first frequency-domain resource pool is different from the second frequency-domain resource pool, the second delay is greater than 0, and one of an SCS of a subcarrier comprised in the first time-frequency resource pool in frequency domain or an SCS of a subcarrier comprised in the second time-frequency resource pool in frequency domain is used to determine the second delay.

11. The second node according to claim 8, wherein the reference delay is equal to a third delay, an SCS of a subcarrier comprised in the first time-frequency resource pool in frequency domain is equal to a first SCS, and an SCS of a subcarrier comprised in the second time-frequency resource pool in frequency domain is equal to a second SCS, the first SCS is used to determine a first characteristic delay, the second SCS is used to determine a second characteristic delay, and one of the first characteristic delay or the second characteristic delay is used to determine the third delay.

12. The second node according to claim 8, wherein the first signaling is used to determine a length of a time interval between a start time of the first multicarrier symbol and an end time for receiving the first signaling; the reference delay is equal to a time length of a positive integral number of OFDM symbol(s) other than an earliest OFDM symbol in a slot, the OFDM symbol(s) corresponds(correspond) to an SCS of a subcarrier in the first frequency-domain resource pool, or the OFDM symbol(s) corresponds(correspond) to an SCS of a subcarrier in the second frequency-domain resource pool.

13. The second node according to claim 8, wherein the third transmitter transmits third information and fourth information; wherein the third information is used to indicate the first frequency-domain resource pool and an SCS of a subcarrier comprised in the first frequency-domain resource pool, and the fourth information is used to indicate the second frequency-domain resource pool and an SCS of a subcarrier comprised in the second frequency-domain resource pool.

14. A method in a first node for wireless communications, comprising:
receiving first information, the first information being used to determine a target time-frequency resource set, an earliest multicarrier symbol comprised in the target time-frequency resource set in time domain being a first multicarrier symbol, frequency-domain resources comprised in the target time-frequency resource set belonging to a first frequency-domain resource pool;
transmitting a first signal, frequency-domain resources occupied by the first signal belonging to a second frequency-domain resource pool, a frequency-domain relation between the first frequency-domain resource pool and the second frequency-domain resource pool being used to determine a reference delay;
receiving a second signal, a length of a time interval between a start time of a second multicarrier symbol and an end time for receiving the second signal being equal to the reference delay, the start time of the second multicarrier symbol being not earlier than the end time for receiving the second signal; and
when the first multicarrier symbol is not earlier than the second multicarrier symbol, transmitting second information;
wherein when the second information is transmitted, the target time-frequency resource set is used for a transmission of the second information; time-frequency resources occupied by the first signal are used to determine radio resources occupied by the second signal; information carried by the second signal is used to determine the second information, and a transmitter of the first information is different from a transmitter of the second signal.

15. The method in a first node according to claim 14, wherein the reference delay is not less than a first delay, and a length of a switching time between a reception and a transmission of the first node is used to determine the first delay.

16. The method in a first node according to claim 14, wherein the reference delay is not less than a second delay; when the first frequency-domain resource pool is the same as the second frequency-domain resource pool, the second delay is equal to 0; when the first frequency-domain resource pool is different from the second frequency-domain resource pool, the second delay is greater than 0, and one of an SCS of a subcarrier comprised in the first time-frequency resource pool in frequency domain or an SCS of a subcarrier comprised in the second time-frequency resource pool in frequency domain is used to determine the second delay.

17. The method in a first node according to claim 14, wherein the reference delay is equal to a third delay, an SCS of a subcarrier comprised in the first time-frequency resource pool in frequency domain is equal to a first SCS, and an SCS of a subcarrier comprised in the second time-frequency resource pool in frequency domain is equal to a second SCS, the first SCS is used to determine a first characteristic delay, the second SCS is used to determine a second characteristic delay, and one of the first characteristic delay or the second characteristic delay is used to determine the third delay.

18. The method in a first node according to claim 14, comprising:

receiving a first signaling;

wherein the first signaling is used to determine time-frequency resources occupied by the first signal, the first signaling is used to determine a length of a time interval between a start time of the first multicarrier symbol and an end time for receiving the first signaling.

19. The method in a first node according to claim 14, comprising:

receiving third information and fourth information;

wherein the third information is used to determine the first frequency-domain resource pool and an SCS of a subcarrier comprised in the first frequency-domain resource pool, and the fourth information is used to determine the second frequency-domain resource pool and an SCS of a subcarrier comprised in the second frequency-domain resource pool.

20. The method in a first node according to claim 14, wherein the reference delay is equal to a time length of a positive integral number of OFDM symbol(s) other than an earliest OFDM symbol in a slot, the OFDM symbol(s) corresponds(correspond) to an SCS of a subcarrier in the first frequency-domain resource pool, or the OFDM symbol(s) corresponds(correspond) to an SCS of a subcarrier in the second frequency-domain resource pool.

* * * * *